(12) United States Patent
Sasaki

(10) Patent No.: US 10,048,095 B2
(45) Date of Patent: Aug. 14, 2018

(54) APPARATUS HAVING AN ENCODER WITH AN ORIGIN DETECTION PATTERN

(71) Applicant: CANON PRECISION INC., Hirosaki-shi (JP)

(72) Inventor: Ryo Sasaki, Yokohama (JP)

(73) Assignee: Canon Precision, Inc., Aomori-Ken (JP)

( * ) Notice: Subject to any disclaimer, the term of this patent is extended or adjusted under 35 U.S.C. 154(b) by 256 days.

(21) Appl. No.: 15/045,027

(22) Filed: Feb. 16, 2016

(65) Prior Publication Data

US 2016/0258785 A1    Sep. 8, 2016

(30) Foreign Application Priority Data

Mar. 6, 2015 (JP) ................................ 2015-044220

(51) Int. Cl.
    *G01D 5/347* (2006.01)
(52) U.S. Cl.
    CPC ....... *G01D 5/34707* (2013.01); *G01D 5/3473* (2013.01); *G01D 5/34715* (2013.01); *G01D 5/34746* (2013.01); *G01D 5/34776* (2013.01)
(58) Field of Classification Search
    CPC ............ G01D 5/34707; G01D 5/3473; G01D 5/34746; G01D 5/34776; G01D 5/34715; G01D 5/24438; G01D 5/24428; G01D 5/2451; G01D 5/2452; G01D 5/2454; G01D 5/2455; G01D 5/2457; G01D 5/2458
    See application file for complete search history.

(56) References Cited

U.S. PATENT DOCUMENTS

| 7,449,678 B2 | 11/2008 | Ito |
| 2006/0267822 A1 | 11/2006 | Ito |

(Continued)

FOREIGN PATENT DOCUMENTS

| EP | 2908101 A2 | 8/2015 |
| JP | S63-281015 A | 11/1988 |
| JP | H09-304112 A | 11/1997 |

(Continued)

OTHER PUBLICATIONS

EESR, counterpart of EP application No. 16155436.5, dated Aug. 1, 2016.

*Primary Examiner* — Que T Le
*Assistant Examiner* — Jennifer Bennett
(74) *Attorney, Agent, or Firm* — Canon U.S.A., Inc. IP Division

(57) ABSTRACT

An origin detector includes detecting element groups having a first to a fourth detector, is configured so that a first signal sensitivity of the detectors of a center is larger than a second signal sensitivity of the detectors of a periphery, reads an origin detecting pattern including an origin pattern having a length along a detecting direction of a part having a physical characteristic different from an origin peripheral part larger than a length along the detecting direction of each detecting element group, and outputs a first signal using the first and third detectors, and a second signal using the second and fourth detectors. A processor acquires a third signal from the first signal and a first threshold, and a fourth signal from the second signal and a second threshold, and outputs a fifth signal using the third and fourth signals as an origin signal.

4 Claims, 39 Drawing Sheets

(56) References Cited

U.S. PATENT DOCUMENTS

2012/0205527 A1    8/2012  Yoshida et al.
2016/0161295 A1*   6/2016  Uemura ............ G01D 5/34715
                                                  250/231.14

FOREIGN PATENT DOCUMENTS

| JP | 2000-304574 A | 11/2000 |
| JP | 2006-71535 A  | 3/2006  |
| JP | 2009-25286 A  | 2/2009  |
| JP | 2010-48833 A  | 3/2010  |
| JP | 2010-223631 A | 10/2010 |
| JP | 2012103230 A  | 5/2012  |
| JP | 201336945 A   | 2/2013  |

* cited by examiner

APPARATUS HAVING AN ENCODER WITH AN ORIGIN DETECTION PATTERN

BACKGROUND OF THE INVENTION

Field of the Invention

The invention relates an encoder including a detecting function of an origin position.

Description of the Related Art

An encoder is currently used as a means for detecting a position and a velocity. An example of the encoder is an incremental encoder. Though a counter accumulates a detecting position of the incremental encoder by relative displacement between a scale and a sensor, the detecting position is lost because the counter is reset just after supplying power. Thus, an operation for detecting an origin position is performed by relative displacement between the scale and the sensor when the power is supplied, and the counter is reset when the origin position is realized by an origin signal. This is origin detection. After origin detection, position detection from the origin position becomes performable.

In encoder disclosed in Japanese Patent Laid-Open No. 2012-103230, a digitized origin signal is output based on an origin detecting signal reflected by a pattern for generating an origin signal and acquired by binarizing an output signal, which changes at a predetermined gradient and are entered into a detector.

However, in Japanese Patent Laid-Open No. 2012-103230, when the origin detecting signal varies on a high voltage side or a low voltage side by a noise, an output phase from a binarizing circuit changes and an origin position may be mistaken.

Additionally, when the configuration of Japanese Patent is applied to a rotary encoder, the origin signal is output two times at different angles relative to a rotation angle of the whole circumference. This is because the configuration of Japanese Patent Laid-Open No. 2012-103230 fails to include a method to judge a pattern boundary facing to an origin pattern that a rotary scale has. When the origin signal is output two times at different angles to determine an initial angle of the rotary angle using the origin signal, the rotary encoder may fail to detect the rotation angle.

SUMMARY OF THE INVENTION

In view of the foregoing, the invention provides an encoder capable of reducing false detection of an origin signal and suppressing an output of the origin signal at an end part of an origin detecting pattern other than an end part of an origin detecting pattern set as an origin.

An encoder as one aspect of the invention includes a scale including an origin detecting pattern, an origin detector reading the origin detecting pattern, and a processor outputting an origin signal. The origin detector includes a plurality of detecting element groups. Each detecting element group includes at least a first detector, a second detector, a third detector, and a fourth detector. The origin detector is configured so that a first signal sensitivity of the detectors distributed at a center is larger than a second signal sensitivity of the detectors distributed at a periphery. The origin detecting pattern is configured so that a length along a detecting direction of a part, which is detected by the origin detector and has a physical characteristic different from an origin peripheral part, is larger than a length along the detecting direction of each detecting element group. The origin detector outputs a first signal based on the first and third detectors, and a second signal based on the second and fourth detectors. The processor acquires a third signal by processing the first signal and a first threshold, and a fourth signal by processing the second signal and a second threshold, and outputs a fifth signal acquired by processing the third and fourth signals as the origin signal.

Further features of the present invention will become apparent from the following description of exemplary embodiments (with reference to the attached drawings).

DESCRIPTION OF THE PREFERRED EMBODIMENTS

Figure 1:
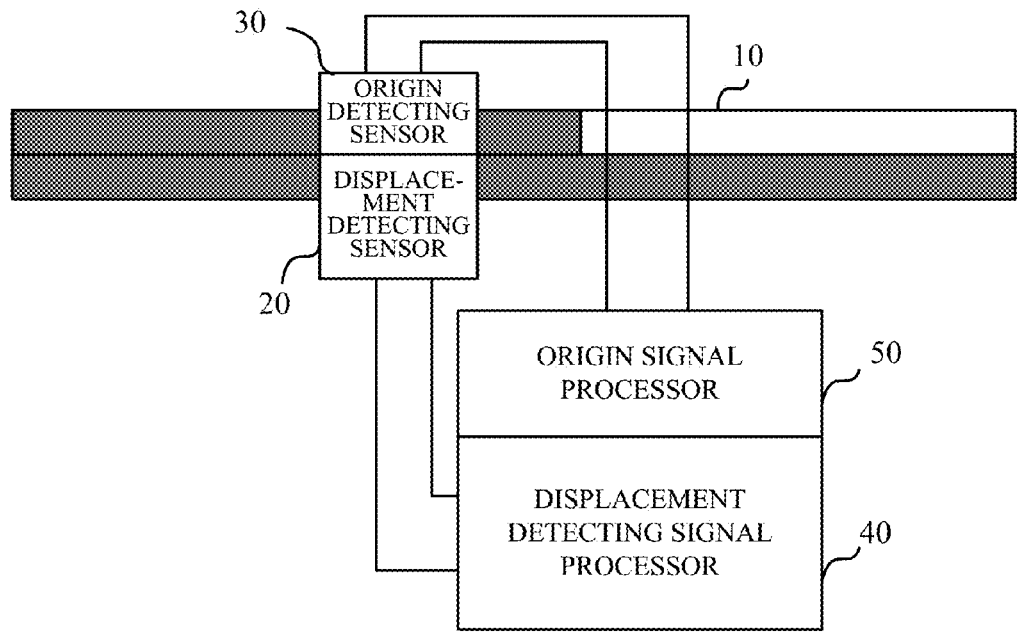
FIG. 1 is a schematic diagram illustrating a configuration of an encoder according to Embodiment 1.

Exemplary embodiments of the invention will be described below with reference to the accompanied drawings. In each of the drawings, the same elements will be denoted by the same reference numerals and the duplicate descriptions thereof will be omitted.

Embodiment 1

In this embodiment, a linear type encoder detecting moving amounts in a uniaxial direction will be described as example. FIG. 1 is a schematic diagram illustrating a configuration of an encoder according to this embodiment. The encoder includes a scale 10, a displacement detecting sensor (displacement detector) 20, an origin detecting sensor (origin detector) 30, a displacement detecting signal processor 40, and an origin signal processor 50. The encoder according to this embodiment is a reflective type optical incremental encoder detecting relative displacement between the scale 10, and the displacement detecting sensor 20 or the origin detecting sensor 30. The scale 10 is attached along a uniaxial moving direction of a measured object, and further the displacement detecting sensor 20 is attached to a fixing member so as to detect displacement of the measured object.

When the scale 10 is positioned at an origin position, an origin signal from the origin detecting sensor 30 is sent to the displacement detecting signal processor 40 as a digital pulse.

Figure 2:
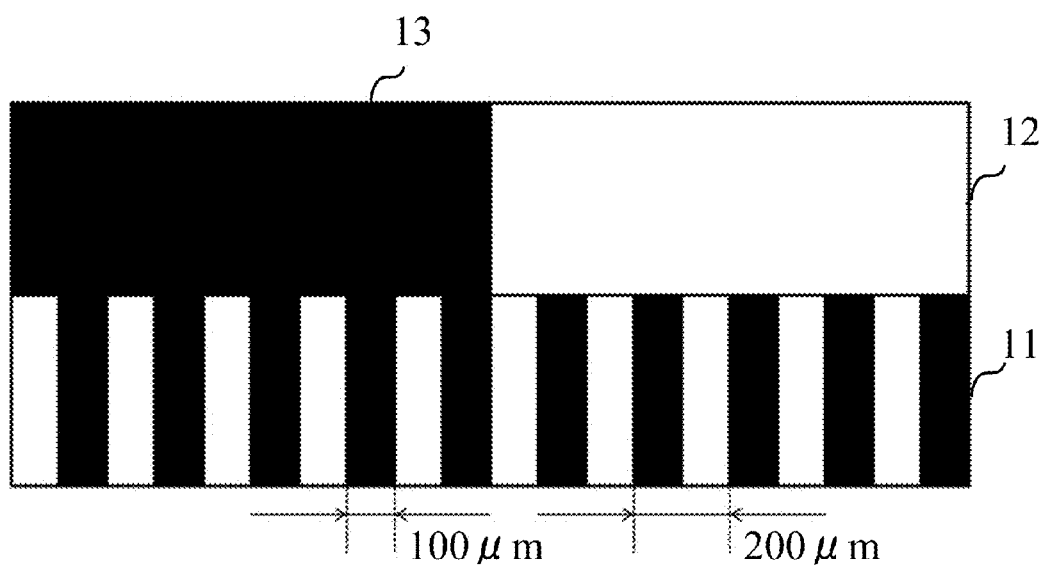
FIG. 2 is a schematic diagram illustrating tracks of a scale.

The scale 10 includes two tracks 11 and 12 as illustrated in FIG. 2. The track 11 is used for displacement detection, and the track 12 is used for origin detection. In each track, a black part is a reflecting part, and a white part is a non-reflecting part. A period of the track 11 is 200 μm, and a reflecting part and a non-reflecting part are alternately arranged at 100 μm. The track 12 includes a reflecting part 13 continuously formed from a center part of the scale 10 to an end part thereof.

Figure 3:
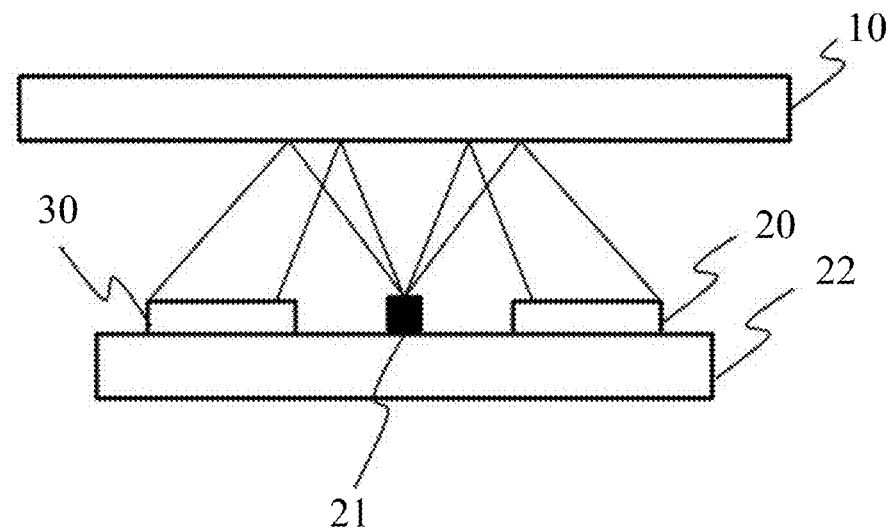
FIG. 3 is a schematic diagram illustrating an optical system.

The displacement detecting sensor 20, the origin detecting sensor 30, and a light source 21 are mounted on a mounting substrate 22 as illustrated in FIG. 3. The displacement detecting sensor 20 receives a light, which is emitted from a light source 21 to irradiate the track 11 and is reflected by the track 11, and the origin detecting sensor 30 receives a light, which is emitted from the light source 21 to irradiate the track 12 and is reflected by the track 12. This configuration is a divergent light flux configuration where a parallel light flux lens tying light flux parallel to each other is not existed between a light source and a scale. The divergent light flux configuration is a configuration where a light emitted from a light source is emitted so as to have a uniform spread without being parallel or concentrating on a single point. In this embodiment, an image of a pattern having a width P on the scale 10 is enlarged to become a width 2P on each sensor. Though each sensor is mounted on the same mounting substrate 22 in this embodiment, each sensor may be mounted on a different substrate. Additionally, in this embodiment, the same light source 21 is used relative to each sensor, but a different light source may be used relative to each sensor. Moreover, in this embodiment, displacement detection and origin detection are optically performed, but may be magnetically performed.

Figure 4:
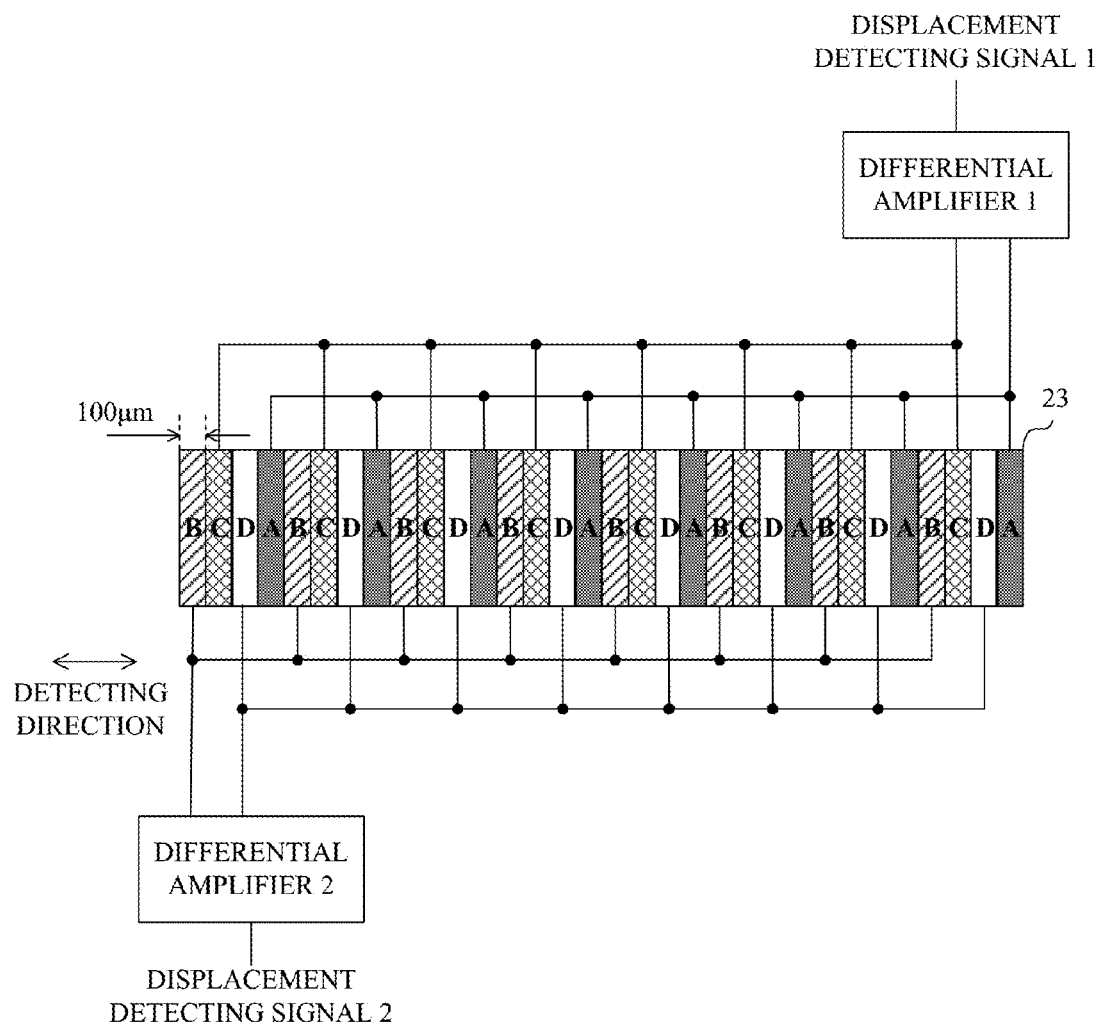
FIG. 4 is a schematic diagram illustrating detecting blocks of a displacement detecting sensor.

The displacement detecting sensor 20 includes detecting blocks as illustrated in FIG. 4. In FIG. 4, light receiving elements A-D output voltages proportional to light receiving quantity. A light receiving element B, a light receiving element C, a light receiving element D, and a light receiving element A are arranged in order from an end, and 8 periods of this repeating unit are arranged on a light receiver 23. Each length of the light receiving elements A to D in a displacement detecting direction is 100 μm, and a length of the light receiver 23 is 3200 μm.

A differential amplifier 1 takes a difference between voltages output from the light receiving elements A and C on the basis of the central voltage, and a differential amplifier 2 takes a difference between voltages output from the light receiving elements B and D on the basis of the central voltage. An output of the differential amplifier 1 is a displacement detecting signal 1, and an output of the differential amplifier 2 is a displacement detecting signal 2. When VA-VD respectively represent each output voltage of light receiving elements A-D, V1 represents an output voltage value of the differential amplifier 1 (first signal), V2 represents an output voltage value of the differential amplifier 2 (second signal), and Voffset represents the central voltage, the first and second signals V1 and V2 are represented by the following expressions (1) and (2).

$$V1 = (VA - VC) + V\text{offset} \quad (1)$$

$$V2 = (VB - VD) + V\text{offset} \quad (2)$$

Output voltages VA-VD varies based on changes of detected physical characteristics. Since an optical encoder is used in this embodiment, the detected physical characteristics are reflecting light quantity.

Since the track 11 in the scale 10 is patterns so as to change brightness in accordance with a period 200 μm, a reflected light from the track 11 is enlarged two times on the light reflecting part 23 and becomes an image whose brightness changes in accordance with a period 400 μm.

This equals to the arrangement period of the light receiving elements A to D on the light reflecting part 23, and as a result equals to a period interval of outputs of light receiving elements A to D.

On the basis of the above relation, a positional relation between the light receiving elements A and B, and a positional relation between C and D, the light receiving elements C and D output a phase difference signal having a phase difference of 180° from the light receiving element A and a phase difference signal having a phase difference of 180° from the light receiving element B, respectively.

From this relation, the light receiving elements A to D can be regarded as a set of light receiving element group. A group represents a minimum constitutional unit of light receiving elements so as to output the displacement detecting signals 1 and 2 from the displacement detecting unit 20. A phase difference between the displacement detecting signals 1 and 2 is 90°.

When the scale 10 displaces and the displacement detecting sensor 20 are displaced relatively, light receiving quantity of the light receiving elements A to D changes according to displacement and the displacement detecting signals 1 and 2 are output as sinusoidal wave signals.

Figure 5:
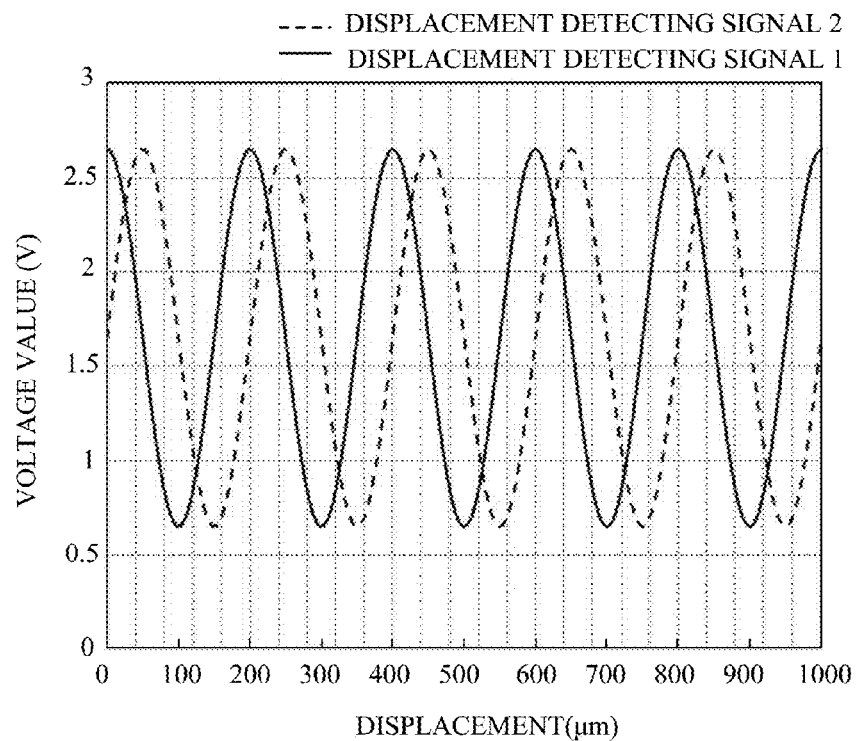
FIG. 5 is a schematic diagram illustrating a signal from the displacement detecting sensor.

The displacement detecting signals 1 and 2 are illustrated in FIG. 5 when the scale 10 relatively moves by 1000 μm with respect to the displacement detecting sensor 20. In FIG. 5, the abscissa axis denotes displacement and the ordinate axis denotes a voltage value. As described above, since the reflected light from the scale 10 becomes a sinusoidal wave signal having the arrangement period of the light receiving elements A-D on the light reflecting part, a period of each displacement detecting signal also becomes 200 μm which is the period of the track 11. Additionally, phase differences between the displacement detecting signals 1 and 2 are 90° and are 50 μm, which is equivalent to 90° phase differences of 200 μm period. A power supply of the displacement detecting sensor 20 is 3.3V and the central voltage becomes 1.65V which is ½ Vcc because the differential amplifiers 1 and 2 take a differential based on the central voltage relative to the power supply. The displacement detection signals 1 and 2 swing between the low and high voltage sides on the basis of the central voltage. The amplitude changes according to light quantity and a positional relation between a sensor and a scale. The amplitude in this embodiment is 2.0 Vp–p.

Figure 6:
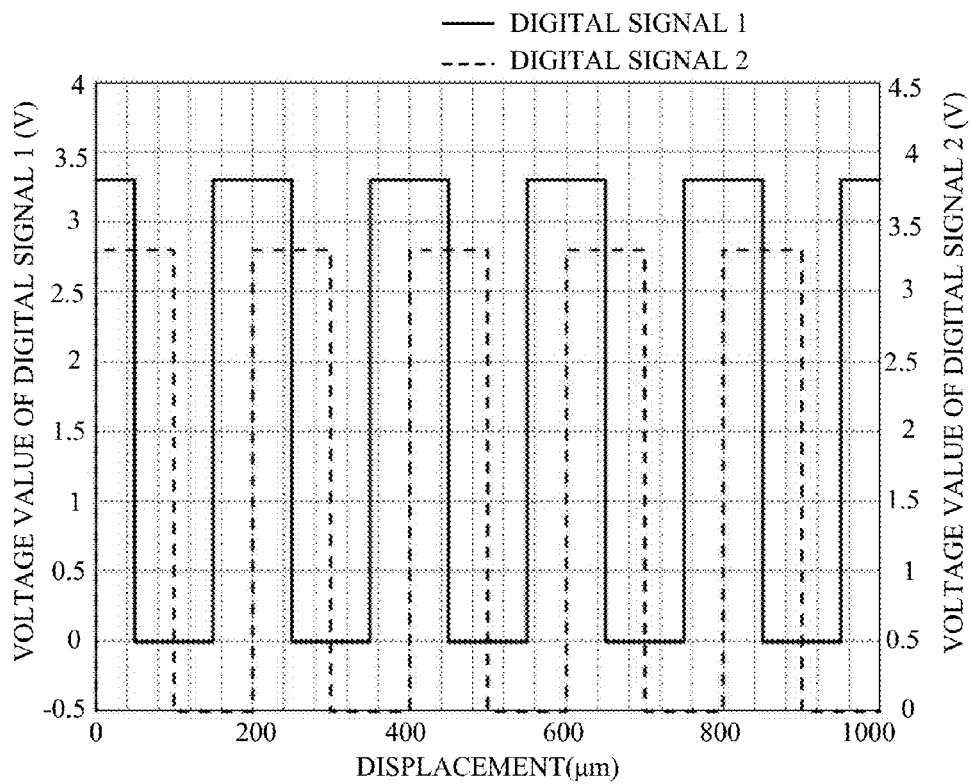
FIG. 6 is a schematic diagram illustrating a signal acquired by binarizing a signal from the displacement detecting sensor.

The displacement detecting signal processor 40 detects displacement based on two phase difference signals. The displacement detecting signal processor 40 binarizes two phase difference signals and counts for displacement detection every period. FIG. 6 is a schematic diagram illustrating binary signals acquired by binarizing the displacement detection signals 1 and 2. In FIG. 6, a digital signal 1 is a binary signal acquired by binarizing the displacement detection signal 1, and a digital signal 2 is a binary signal acquired by binarizing the displacement detection signal 2. Both waveforms of digital signals 1 and 2 rise at every 200 μm which is the period of the displacement detection signals 1 and 2. The displacement detection signal processor 40 determines a displacement direction from combinations of rises of the digital signals 1 and 2, and increases/decreases counts at every period.

Figure 7:
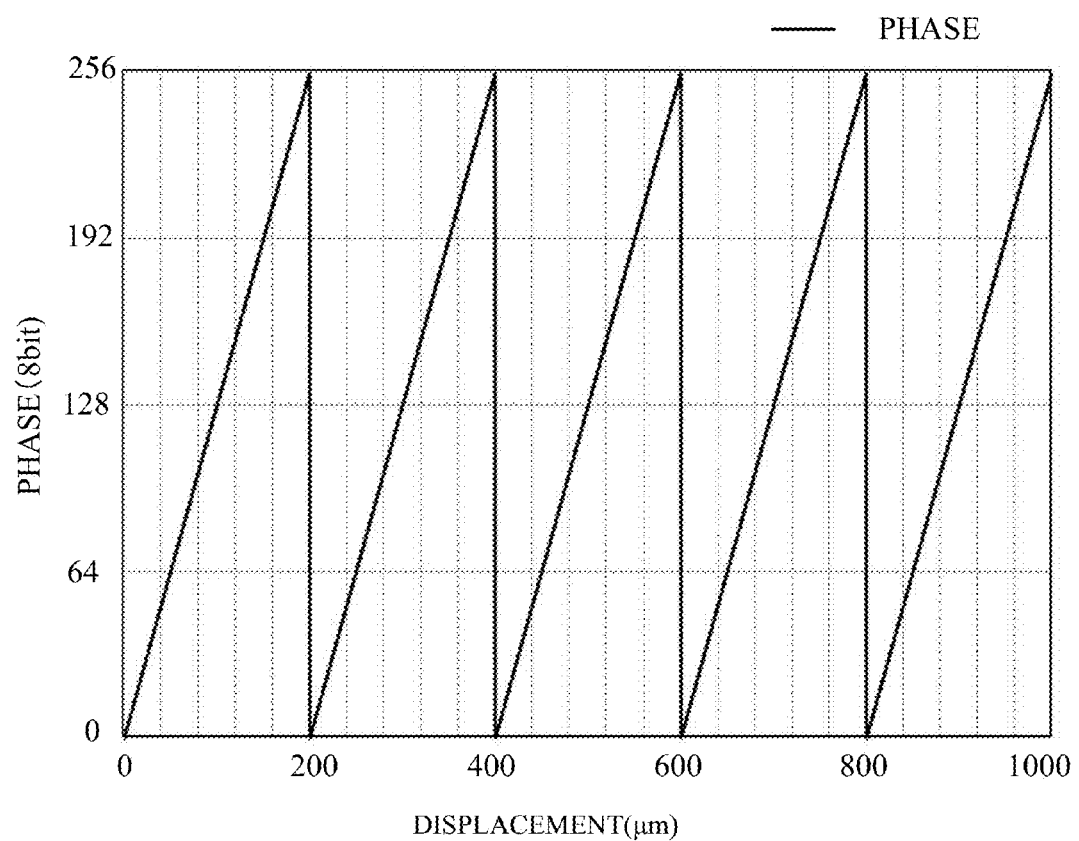
FIG. 7 is a schematic diagram illustrating a phase signal acquired from a signal from the displacement detecting sensor.

Moreover, for displacement detection in the period, the displacement detecting signal processor 40 incorporates a voltage value of the displacement detecting signal as a digital value, and carries out an arc tangent operation using two phase difference signals. FIG. 7 illustrates a phase value (by setting 2π to 256) when the arc tangent operation of the displacement detecting signals 1 and 2 is carried out. In FIG. 7, the abscissa axis denotes displacement and the ordinate axis denotes a phase in a sinusoidal wave. A phase changes 0-255 in a sinusoidal wave period, and is repeated when there are a plurality of periods. In other words, when a phase reaches 255, next phase becomes 0. A period is 200 μm in this embodiment, and thus the above repeat repeats five times when the scale 10 relatively moves by 1000 μm with respect to the displacement detecting sensor 20.

A phase calculated using the arc tangent operation is divided by 256 corresponding to 2π to acquire displacement in one period. Detection displacement is acquired using the following expression (3), which combines the acquired displacement with the binarized digital signals 1 and 2. "Position" denotes detection displacement, "cnt" denotes a count value in each period of the displacement detection signals 1 and 2, and "θ" denotes a phase in a sinusoidal wave period acquired by the arc tangent operation of the displacement detection signals 1 and 2.

$$\text{Position}=(cnt+\theta/256)\times 200 \text{ (um)} \quad (3)$$

Figure 8:
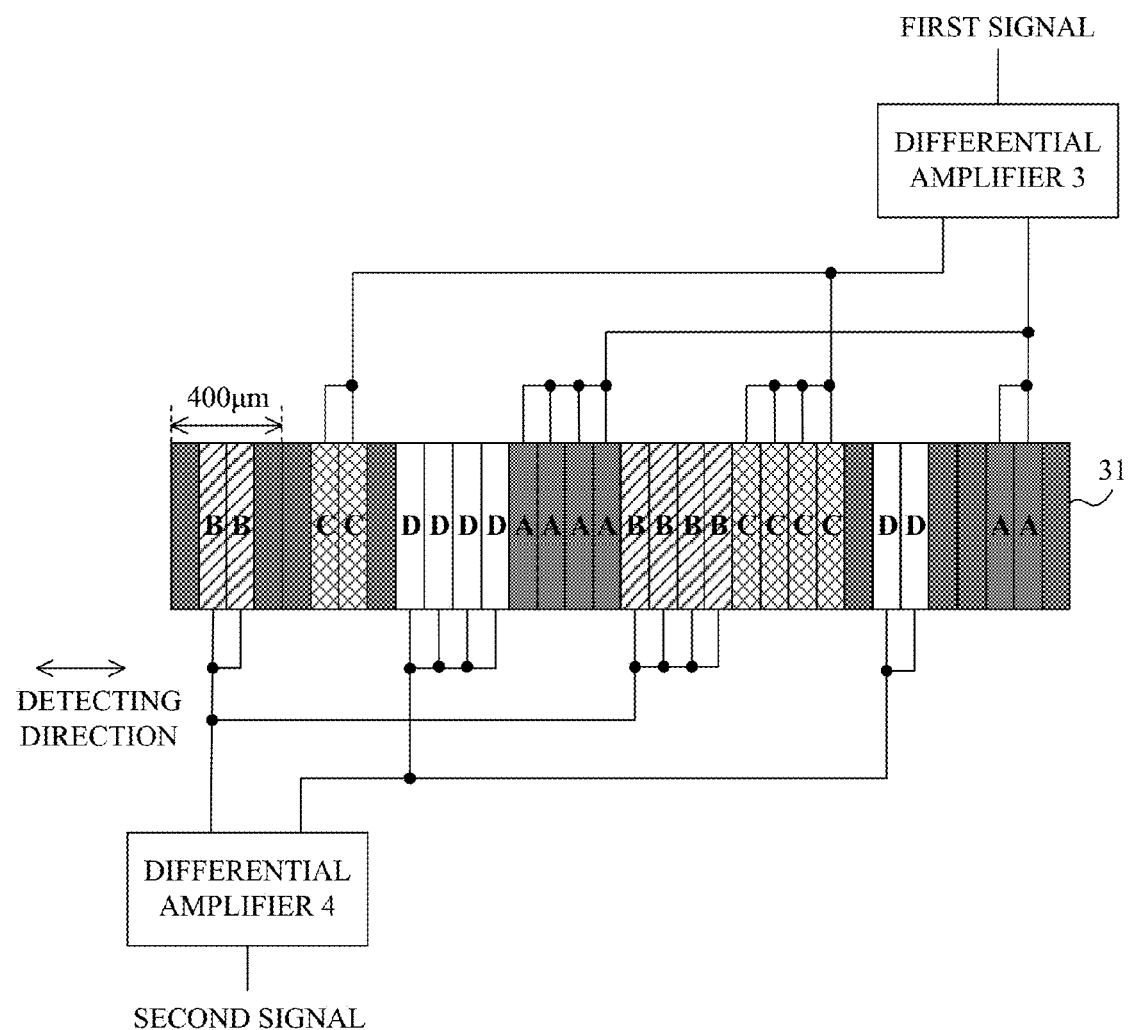
FIG. 8 is a schematic diagram illustrating detecting blocks of an origin detecting sensor.

Next, origin detection according to this embodiment will be described. The origin detection sensor 30 includes detection blocks as illustrated in FIG. 8. In FIG. 8, light receiving elements (detector) A to D output voltages proportional to light receiving quantity. The light receiving element B, the light receiving element C, the light receiving element D, and the light receiving element A are arranged in order from an end, and two periods of this light receiving element array group (detecting element group) are arranged on a light receiver 31. Each length of the light receiving elements A to D in a detecting direction is 400 μm, and a length of the light receiver 31 in the detection direction is 3200 μm. The light receiver 31 includes the light receiving elements A to D in which receiving sensitivity (signal sensitivity) of a periphery part is ½ compared to that of a center part. The periphery part is space including the light receiving elements arranged on left and right sides, in other words, the two light receiving elements B and the two light receiving elements C arranged at the left side and the two light receiving elements A and the two left receiving elements D arranged at the right side in FIG. 8. The center part is space including the light receiving elements arranged at a center of the light receiver 31, in other words, four light receiving elements A, four light receiving elements B, four light receiving elements C, and four light receiving elements D arranged by ½ periods of a light receiving element group along both sides from a center of the light receiver 31. Specifically, focusing on the light receiving elements A, the four light receiving elements A are arranged at the center part and the two light receiving elements A are arranged at the right side. Since output voltage values of the light receiving elements are proportional to arrangement number of the light receiving elements, the light receiving sensitivity (signal sensitivity) of the light receiving elements A arranged at the right side is ½ compared to that of the light receiving elements arranged at the center part. The same applies to the other light receiving elements.

A differential amplifier 3 takes a difference between voltages output from the light receiving elements A and C on the basis of the central voltage, and a differential amplifier 4 takes a difference between voltages output from the light receiving elements B and D on the basis of the central voltage. An output of the differential amplifier 3 is a first signal, and an output of the differential amplifier 4 is a second signal.

When the length in the detecting direction of the light receiver 31 of the origin detecting sensor 30 is x, a phase difference between the first and second signals is x/8 on the light receiver 31, which corresponds to x/16 on the scale, from the arrangement of FIG. 8. This represents that the phase difference between the first and second signals is 400 μm on the light receiver 31, in other words, 200 μm on the scale.

A first threshold and a second threshold are prepared as reference signals so as to detect an origin position using the first and second signals, respectively. These are signals to determine whether or not the first and second signals are signals on an origin, respectively.

Figure 9:
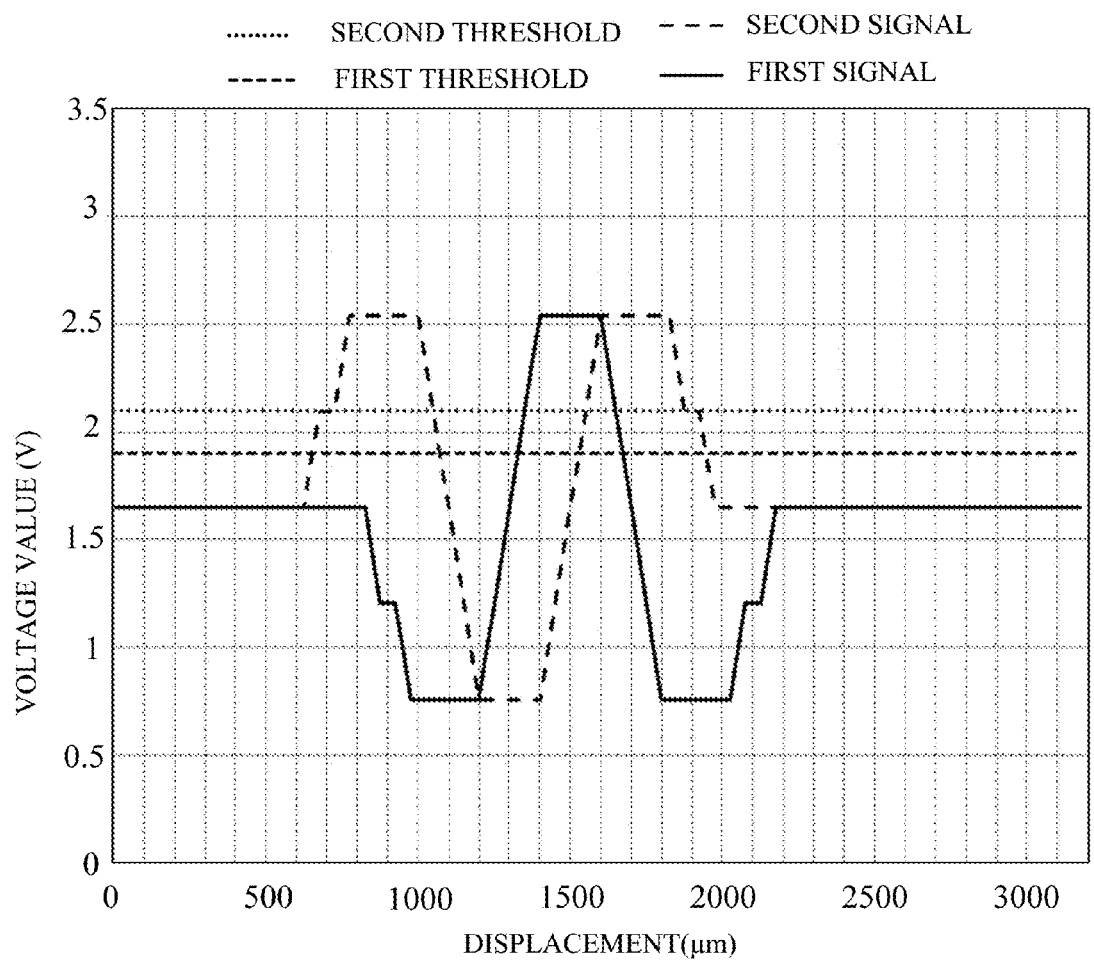
FIG. 9 is a schematic diagram illustrating a first signal, a second signal, a first threshold, and a second threshold according to Embodiment 1.

In this configuration, FIG. 9 is a schematic diagram illustrating the first and second signals and the first and second thresholds when the origin detecting sensor 30 reads the scale including the origin pattern, which is continuously formed from the center part to the end part. In FIG. 9, the abscissa axis denotes displacement, and the ordinate axis denotes a voltage value. A power supply of the origin detecting sensor 30 is 3.3V similar to the displacement detecting sensor 20. Additionally, the central voltage is 1.65V, which is ½ Vcc, because the differential amplifiers 3 and 4 take a differential based on the central voltage relative to the power supply. The first and second signals swing between the low and high voltage sides on the basis of the central voltage. The amplitude changes according to light quantity and a positional relation between a sensor and a scale, and swings between 0.7 to 2.5V in this embodiment.

The origin detecting sensor 30 includes the two light receiving element array groups comprising the light receiving elements A to D as illustrated in FIG. 8, and thus the first and second signals, which are response outputs relative to the reflecting part 13, become two periods of signals. In the detecting direction, the light receiving elements A and B connected with non-inverting input terminals of the differential amplifiers 3 and 4, and the light receiving elements C and D connected with inverting input terminals of the differential amplifiers 3 and 4 are symmetrically arranged relative to a center of the light receiving element array group, respectively. Additionally, the light receiving elements A and B are arranged outside of the light receiving element array group, and the light receiving elements C and D are arranged inside thereof. In this embodiment, the light receiving element B, the light receiving element C, the light receiving element D, and the light receiving element A are arranged in order from the end. However, the arrangement of the light receiving elements is not limited to this arrangement. It is only required that the light receiving elements A and B are adjacent or are arranged on both ends of the light receiving element array groups, and the light receiving elements C and D are adjacent or are arranged on both ends thereof. In other words, the phase differences between the first signal acquired by processing the output signals of the light receiving elements A and C and the second signal acquired by processing the output signals of the light receiving elements B and D are ¼ in a length along the displacement detecting direction of the light receiving element array group.

Figure 10:
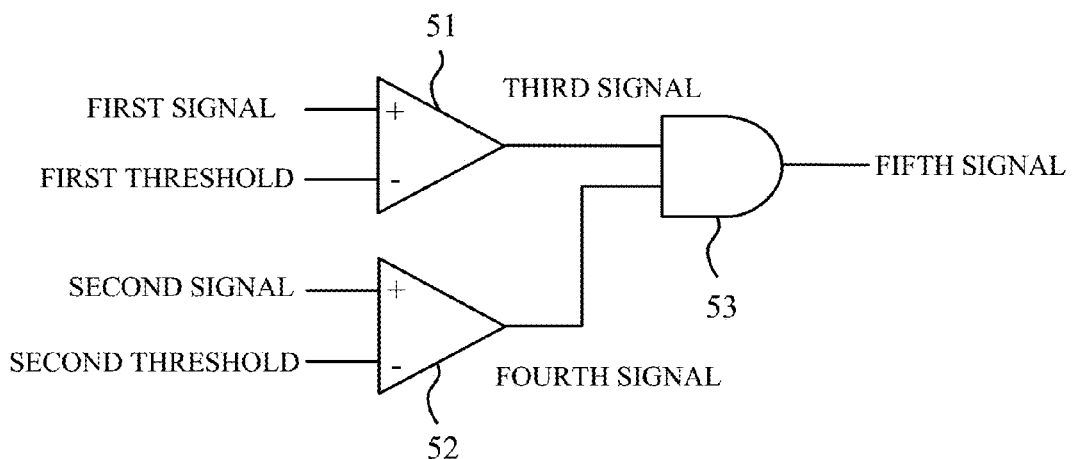
FIG. 10 is a schematic diagram illustrating a processing part of the origin detecting processor.
Figure 11:
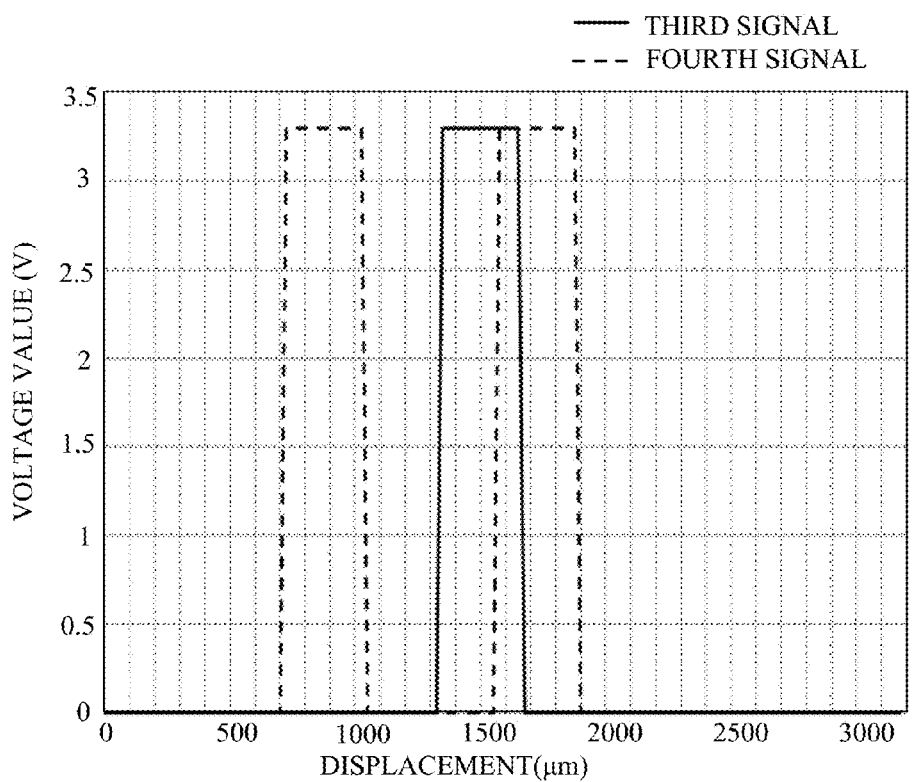
FIG. 11 is a schematic diagram illustrating a third signal, and a fourth signal.
Figure 12:
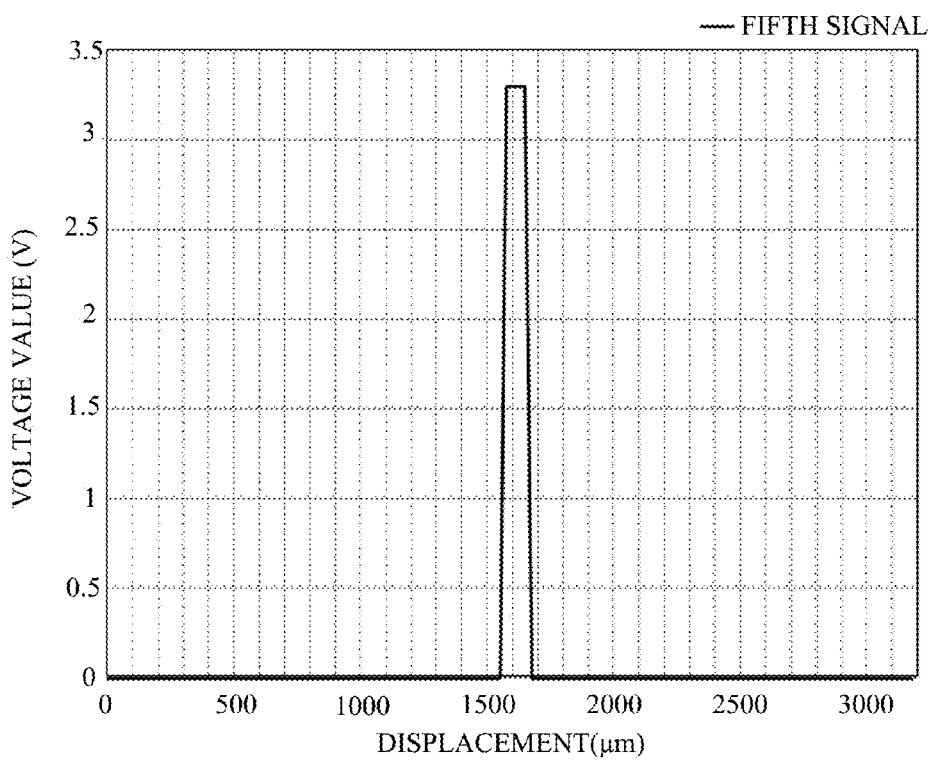
FIG. 12 is a schematic diagram illustrating a fifth signal.

The origin signal processor 50 includes a processing part as illustrated in FIG. 10. A comparator 51 outputs a third signal by comparing the first signal and the first threshold, and a comparator 52 outputs a fourth signal by comparing the second signal and the second threshold. The comparator 51 outputs a high-level signal if the first signal is higher than the first threshold, otherwise outputs a low-level signal. The comparator 52 also outputs a high-level signal if the second signal is higher than the second threshold, otherwise outputs a low-level signal. FIG. 11 is a schematic diagram illustrating the third and fourth signals. Since two periods of each signal are output, an output from each comparator is also two periods of a binarized output. An AND circuit 53 calculates the logical product of the third and fourth signals and outputs a fifth signal. Since both the first and second signals become high-level signals when the reflected light from the reflecting part 13 is incident to the center part of the light receiver 31, the fifth signal, which is one pulse of an origin signal as illustrated in FIG. 12, is generated by being calculated the logical product by the AND circuit 53. In this embodiment, when the fifth signal becomes high-level signal, the displacement detecting signal processor 40 determines that a measured object is positioned at an origin position and then resets a count value at every period to 0. In this embodiment, the origin signal processor 50 is comprised of the comparators 51 and 52 and the AND circuit 53, but may be comprised of any configuration if a signal similar to the fifth signal can be acquired.

Figure 13:
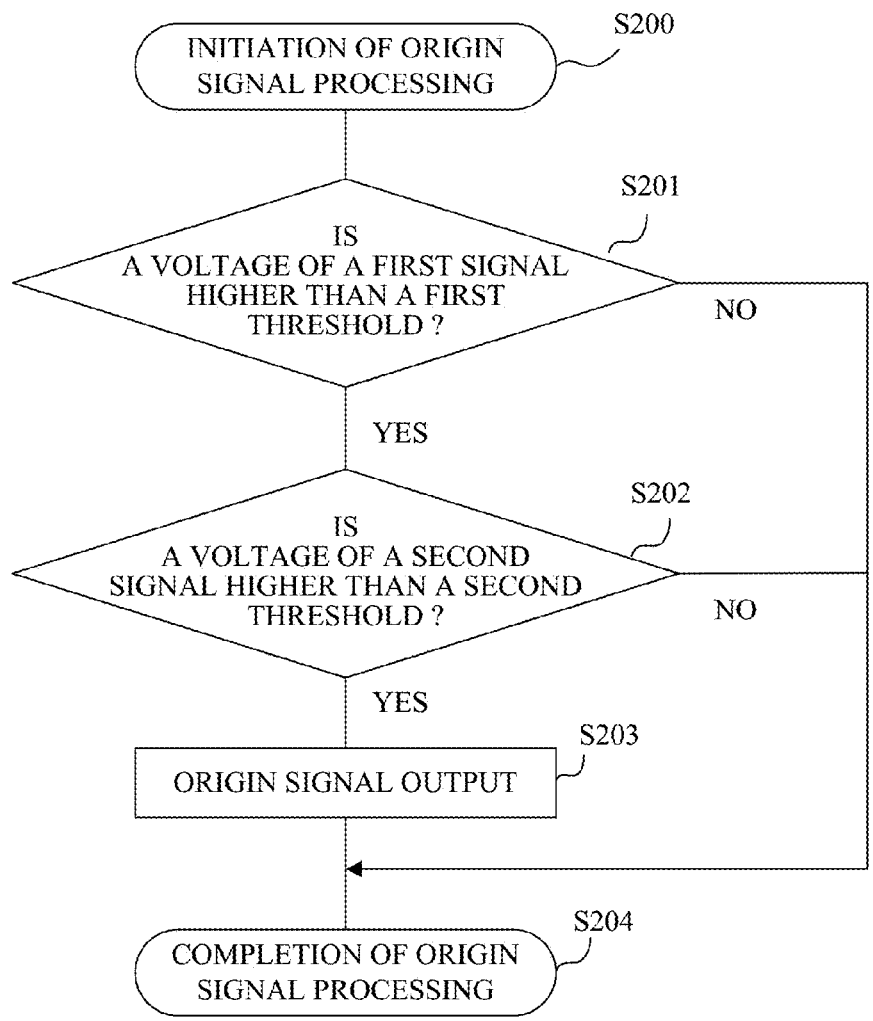
FIG. 13 is a flowchart of an origin signal process.

Regarding the above process, a specific example will be described using a flowchart of FIG. 13. After initiating an origin signal process in a step S200, whether a voltage of the first signal is higher than the first threshold is determined (step S201). If the voltage of the first signal is higher than the first threshold, the process proceeds to next determination, otherwise finishes (step S204). In a step S202, whether a voltage of the second signal is higher than a second threshold is determined. If the voltage of the second signal is higher than the second threshold, an origin signal is output (step S203). In this embodiment, the determination about the voltage of the second signal and the second threshold is determined after the determination about the voltage of the first signal and the first threshold is determined, but these determinations may be in reverse order. Additionally, satisfying both determinations may be determined after determining these determinations at the same time.

As previously mentioned, the fifth signal is activated when both the first and second signals have higher voltages than the central voltage. The first and second thresholds may be thus set as the following expressions (4) and (5), respectively. Voffset1 and Voffset2 are the central voltages of the first and second signals, respectively, and Vref1 and Vref2 are the first and second thresholds, respectively. Moreover, Vcross is a voltage, where the first and second signals intersect, higher than the central voltage (hereinafter referred to as "cross point voltage").

$$V\text{offset1} < V\text{ref1} < V\text{cross} \quad (4)$$

$$V\text{offset2} < V\text{ref2} < V\text{cross} \quad (5)$$

These expressions represent that the first and second thresholds, which are reference signals, are only determined by the central voltage and the cross point voltage, and are not affected by signals from the peripheral part. The central voltage and the cross point voltage respectively have fluctuation components such as light quantity fluctuation, origin pattern fluctuation, and amplifier fluctuation. Thus, the expressions (4) and (5) can be rewritten as the following expressions (6) and (7), respectively. Vom represents a central voltage fluctuation factor, and vcm represents a cross point voltage fluctuation factor.

$$V\text{offset1} + V\text{om} < V\text{ref1} < V\text{cross} - V\text{cm} \quad (6)$$

$$V\text{offset2} + V\text{om} < V\text{ref2} < V\text{cross} - V\text{cm} \quad (7)$$

When the fifth signal becomes high-level signal, the displacement detecting processor 40 determines that the measured object is positioned at the origin position and then resets the count value at every period to 0.

Figure 14:
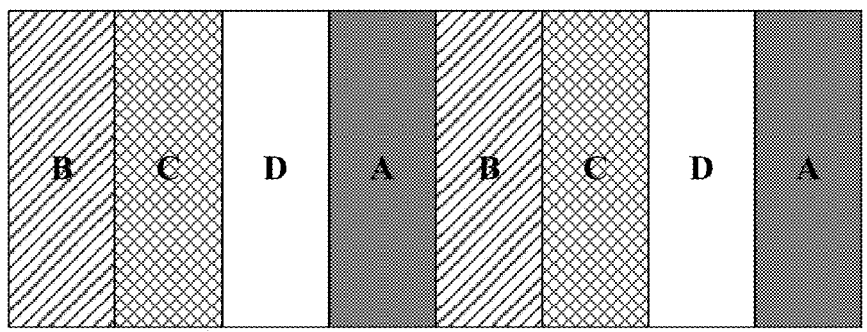
FIG. 14 is a schematic diagram illustrating a light receiver when a light receiving sensitivity ratio is 1.

Next, effects that a light receiving sensitivity (signal sensitivity) ratio $\varphi N/\varphi M$, which is a ratio of sensitivity $\varphi N$ of the periphery part of the light receiver 31 of the origin detecting sensor 30 to sensitivity $\varphi M$ of the center part, is ½ are described. FIG. 14 is a schematic diagram illustrating the light receiver 31 when the light receiving sensitivity (signal sensitivity) ratio $\varphi N/\varphi M$ is 1. The light receiver 31 includes two periods of combination that the light receiving elements B, C, D, and A are arranged in order from the end. As to the light receiving element B in FIG. 14, light receiving sensitivity of the light receiving element B arranged at left side is the same as that of the light receiving element B arranged at the center part, and then the light receiving sensitivity ratio $\varphi N/\varphi M$ is 1.

Figure 15:
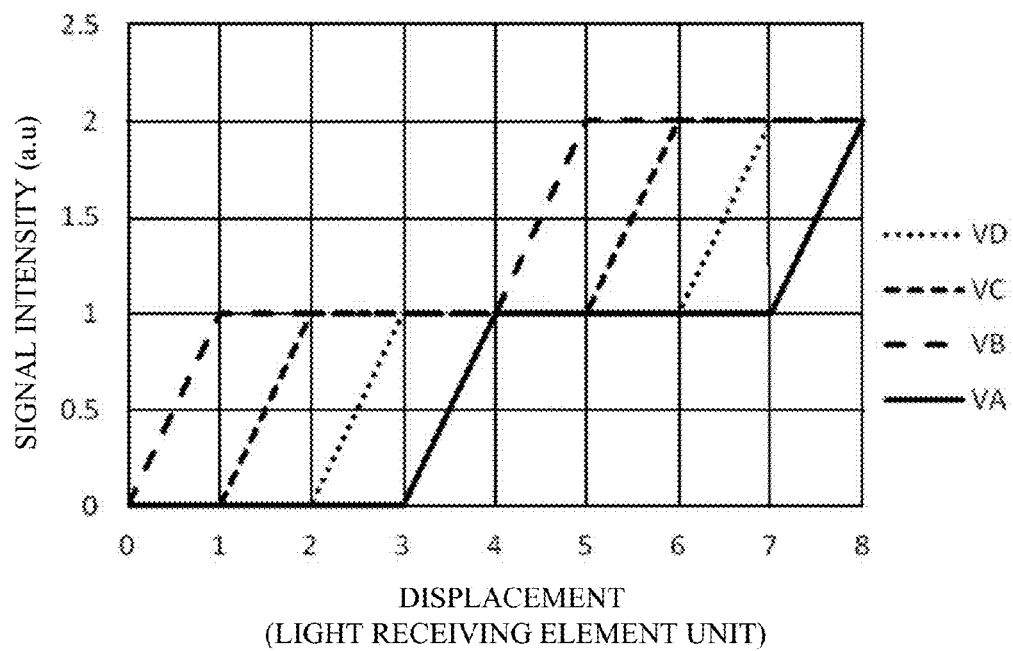
FIG. 15 is a schematic diagram illustrating signal intensity from each light receiving element when a light receiving sensitivity ratio is 1.
Figure 16:
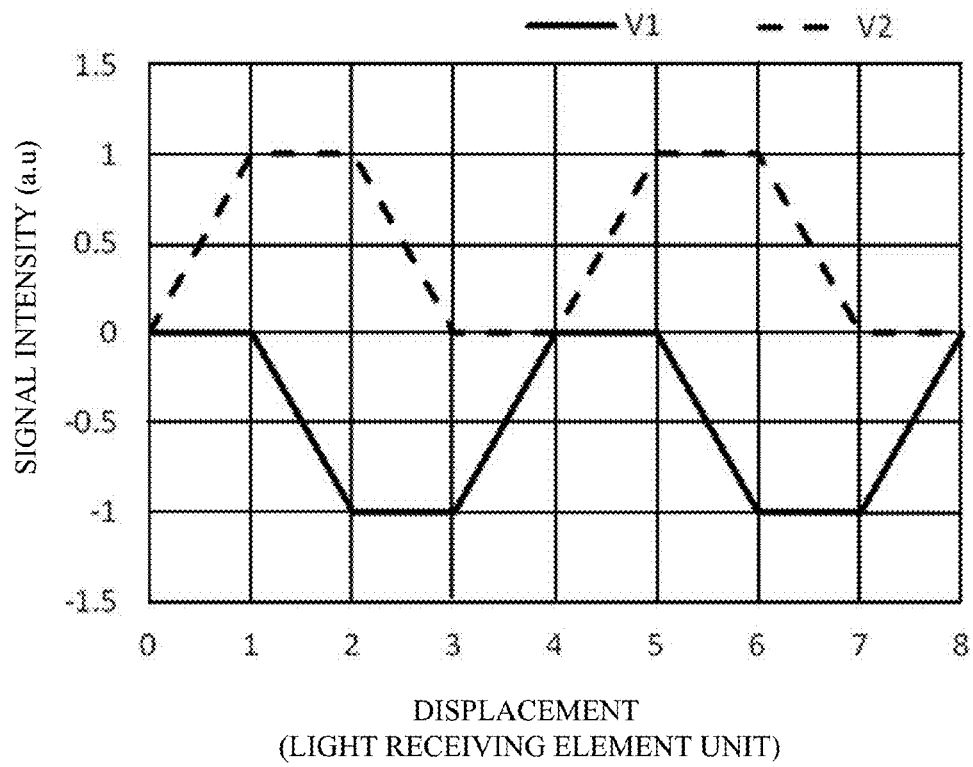
FIG. 16 is a schematic diagram illustrating a signal variation when a difference between the signals of FIG. 15 is taken.

FIG. 15 is a schematic diagram illustrating relations between output signal intensity of the light receiving elements A to D and displacement when the track 12 is displaced from a state that the reflected light from the reflecting part 13 relative to the light receiver 31 is not irradiated to a state that the reflected light from the reflecting part 13 relative to the light receiver 31 is irradiated to the entire reflecting part 13. In FIG. 15, the abscissa axis denotes displacement of the light receiving element unit and the ordinate axis denotes signal intensity. The signal intensity of each light receiving element raises in order of the light receiving element B, the light receiving element C, the light receiving element D, and the light receiving element A according to the arrangement of the light receiving elements as illustrated in FIG. 14 and the light receiving sensitivity (signal sensitivity) ratio. Then, all light receiving sensitivity (signal sensitivity) of light receiving elements are the same, and thus all lifting ratios are the same. When the reflected light from the reflecting part 13 reaches ½ of the light receiver 31, all light receiving elements receives the same light quantity at point 4 in FIG. 15 and output signal intensities of these light receiving elements are the same at this point. Subsequently, the same change based on these signal intensities follows according to displacement of the reflected light from the reflecting part 13, and the output signal intensities of these light receiving elements are again the same when the reflected light from the reflecting part 13 is irradiated to the entire light receiver 31. FIG. 16 is a schematic diagram illustrating signal variations when differences between signal intensities from each light receiving element of FIG. 15 are taken on the basis of an expression (1). In FIG. 16, the abscissa axis denotes displacement of a light receiving element unit, and ordinate axis denotes signal intensity. Moreover, Voffset of the expression (1) is 0 for simplicity. Signal intensity of each light receiving element having the same value at the point 4 of FIG. 15 becomes 0 by taking differences, and the same offset, which signal intensity from each light receiving element after the point 4 has, is also removed. A waveform between the point 0 and the point 4 of an output signal after a differential is the same as a waveform between the point 4 and the point 8 of the output signal, and origin detection is unperformable because only condition is not acquired from each signal.

Figure 17:
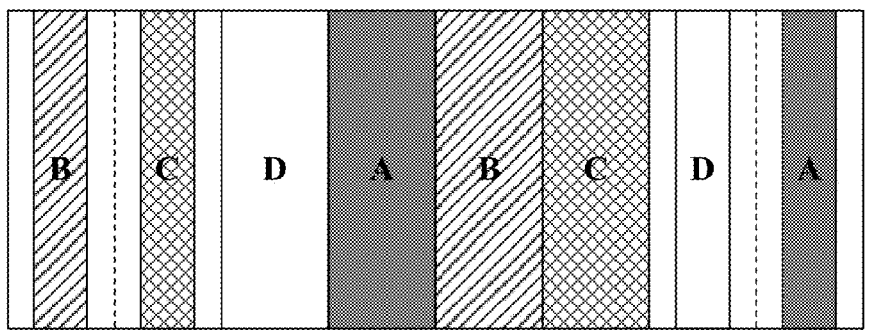
FIG. 17 is a schematic diagram illustrating the light receiver when the light receiving sensitivity ratio is 0.5.
Figure 18:
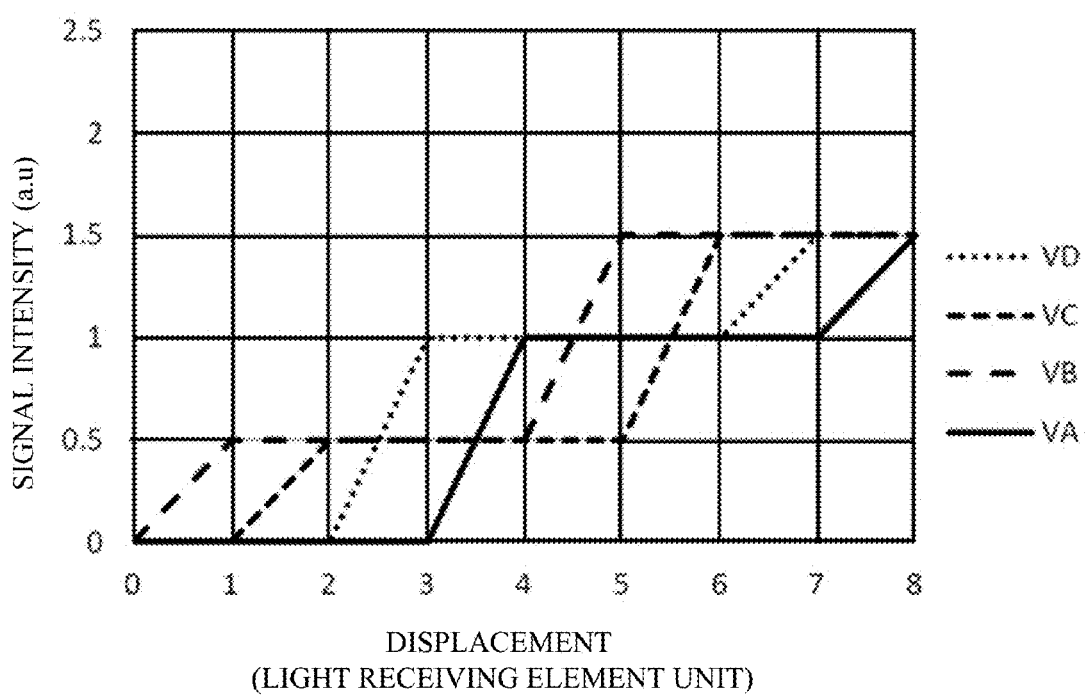
FIG. 18 is a schematic diagram illustrating signal intensity from each light receiving element when a light receiving sensitivity ratio is 0.5.
Figure 19:
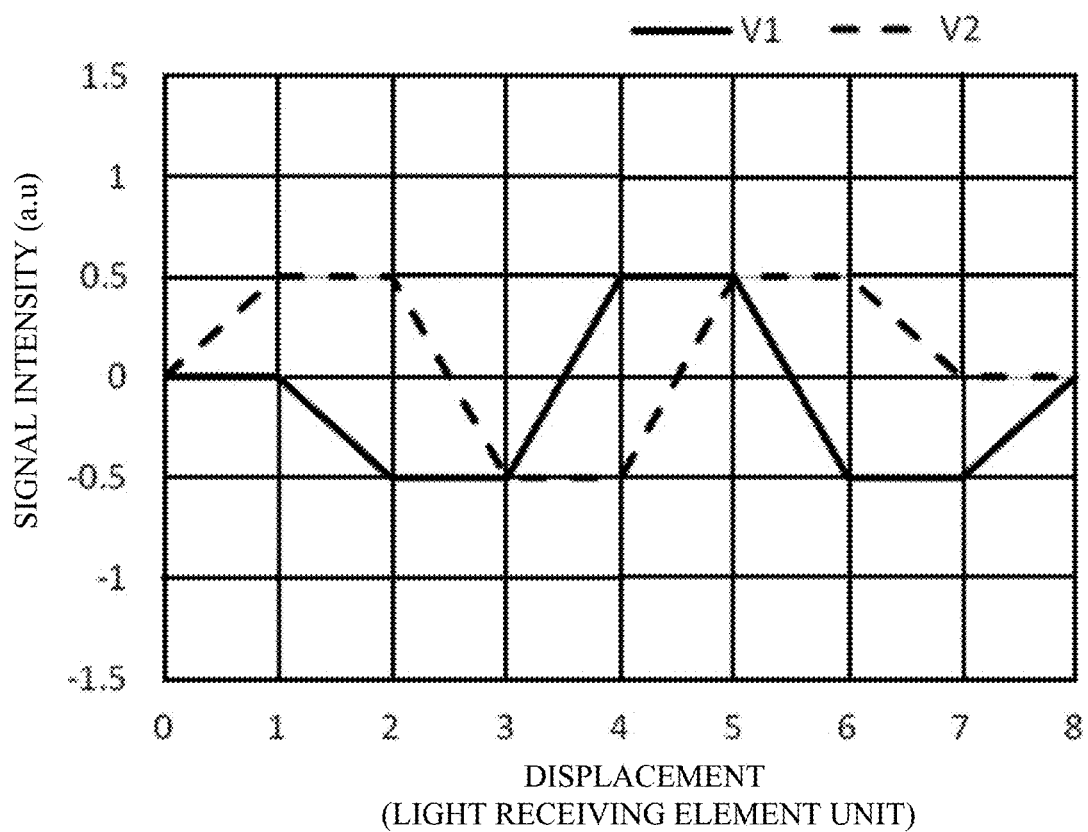
FIG. 19 is a schematic diagram illustrating a signal variation when a difference between the signals of FIG. 18 is taken.
Figure 20A:
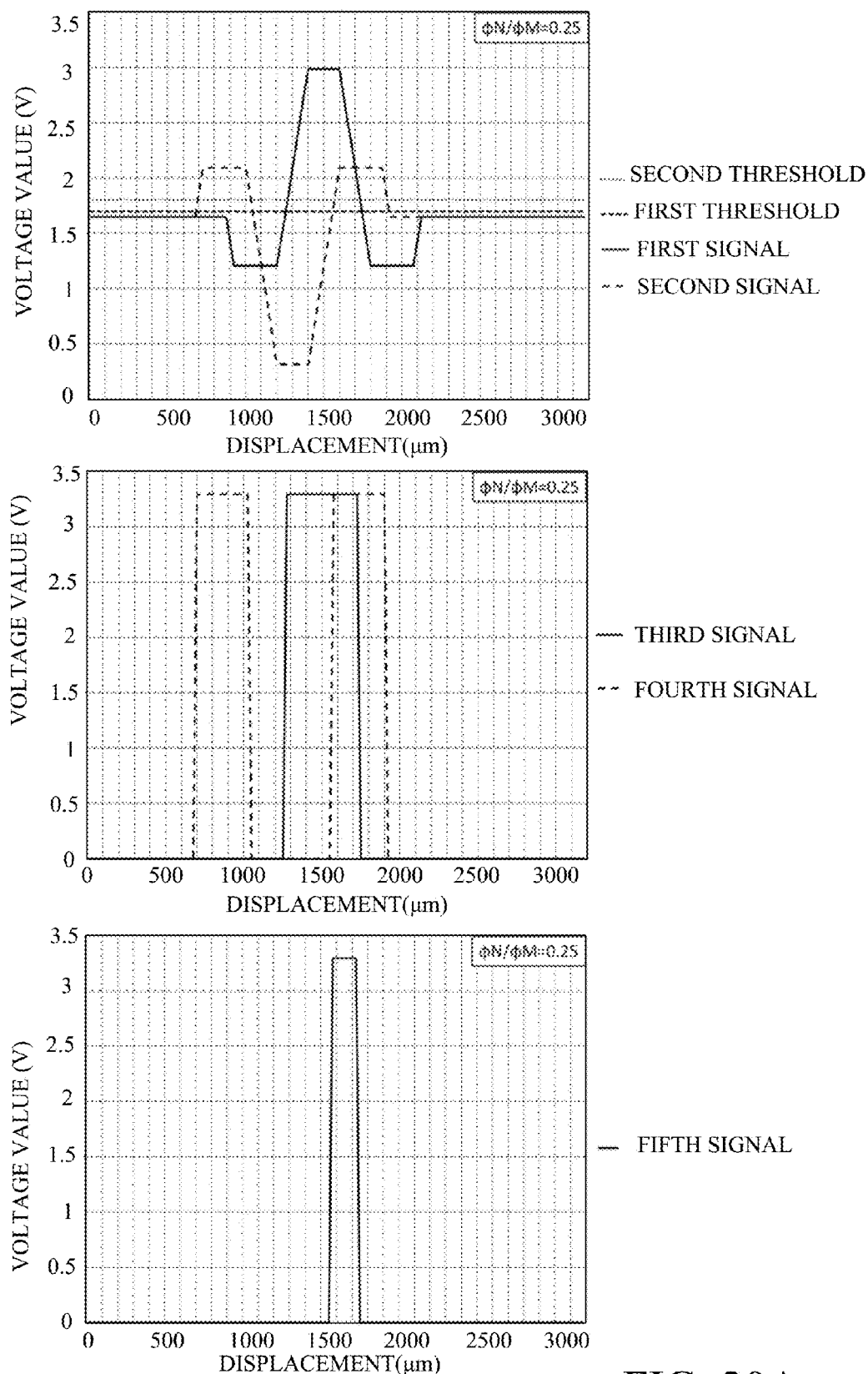
FIG. 20A is a schematic diagram illustrating a first to a fifth signals when the light receiving sensitivity ratio is 0.25.
Figure 20B:
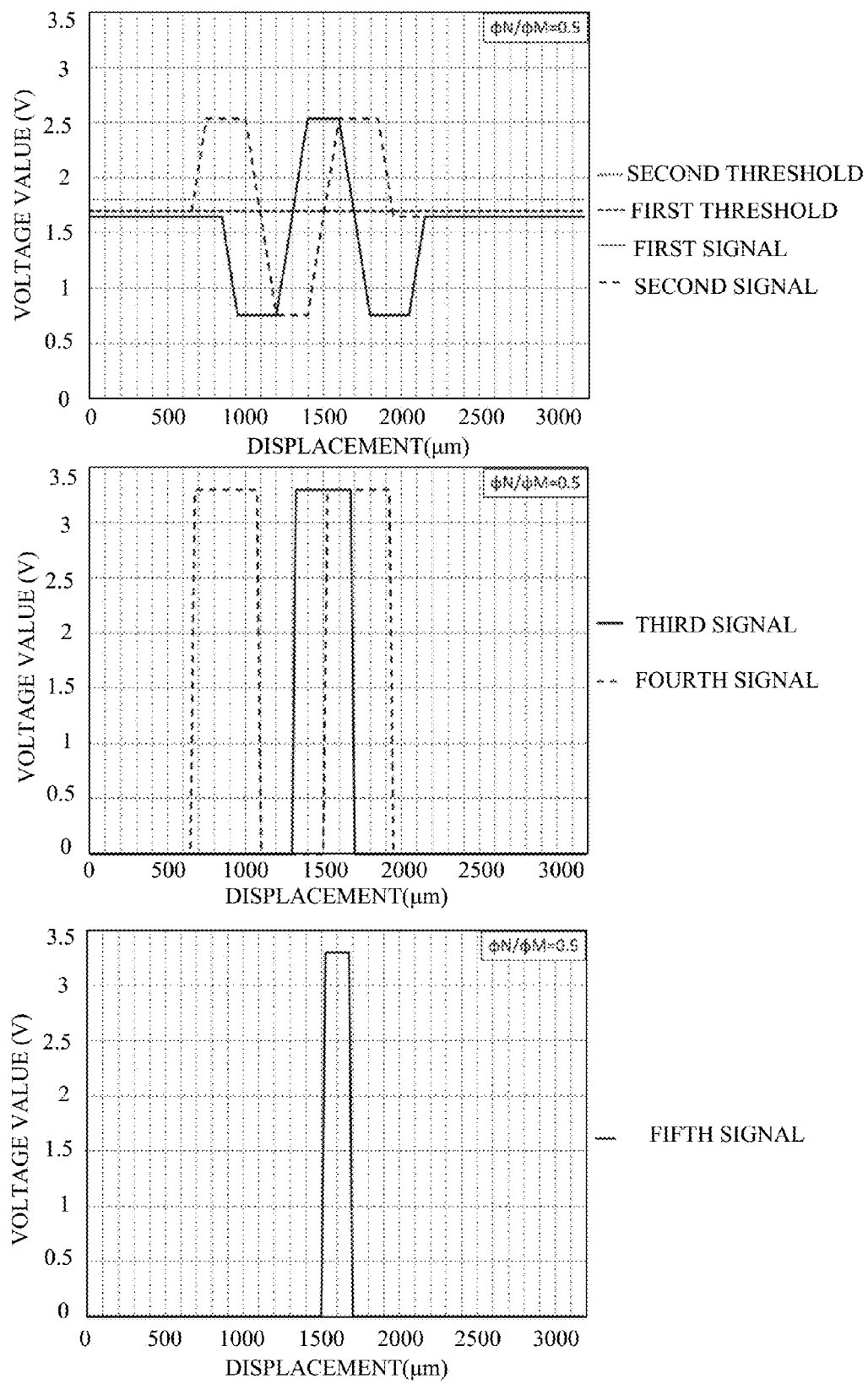
FIG. 20B is a schematic diagram illustrating a first to a fifth signals when the light receiving sensitivity ratio is 0.5.
Figure 20C:
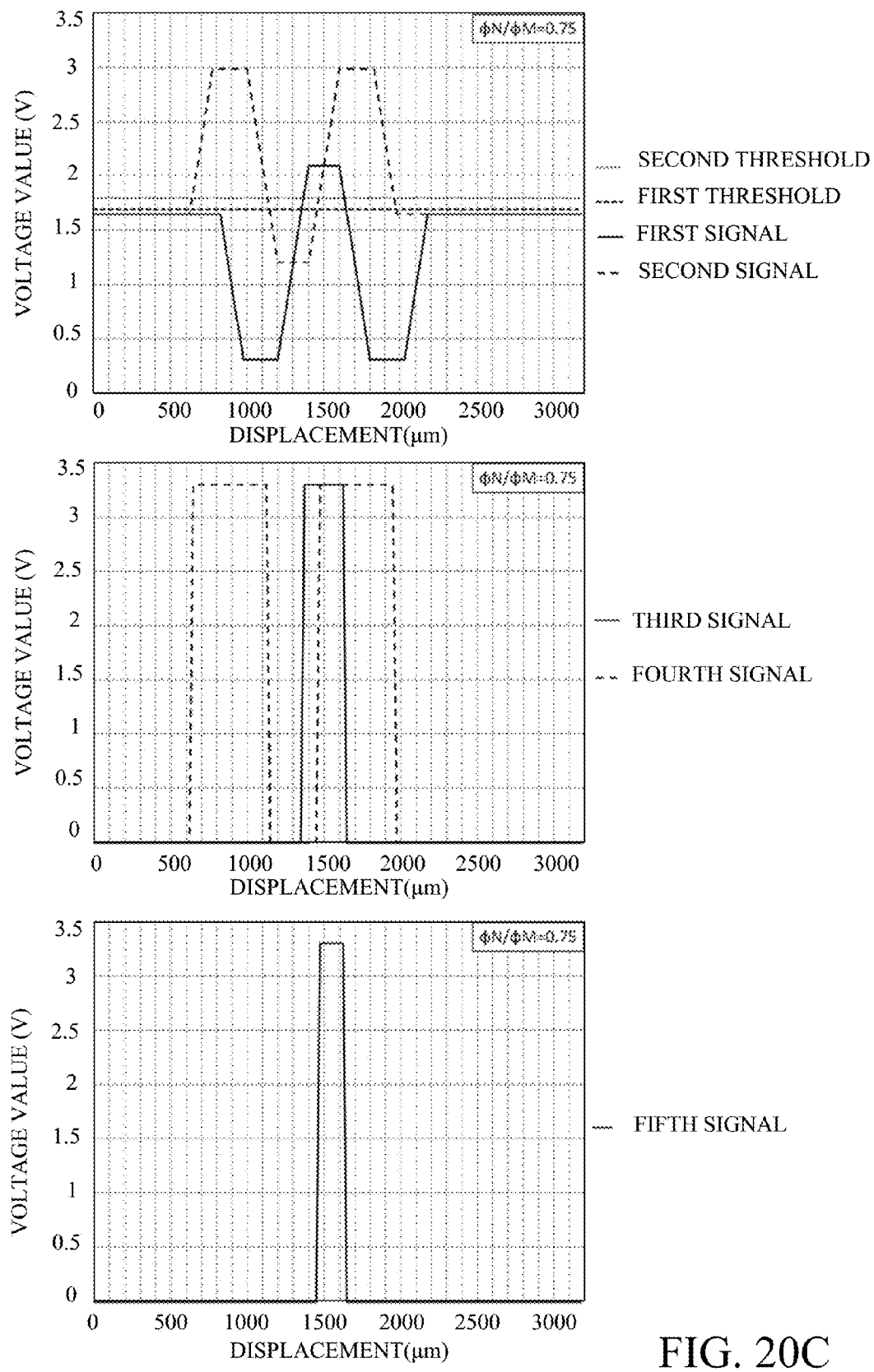
FIG. 20C is a schematic diagram illustrating a first to a fifth signals when the light receiving sensitivity ratio is 0.75.
Figure 20D:
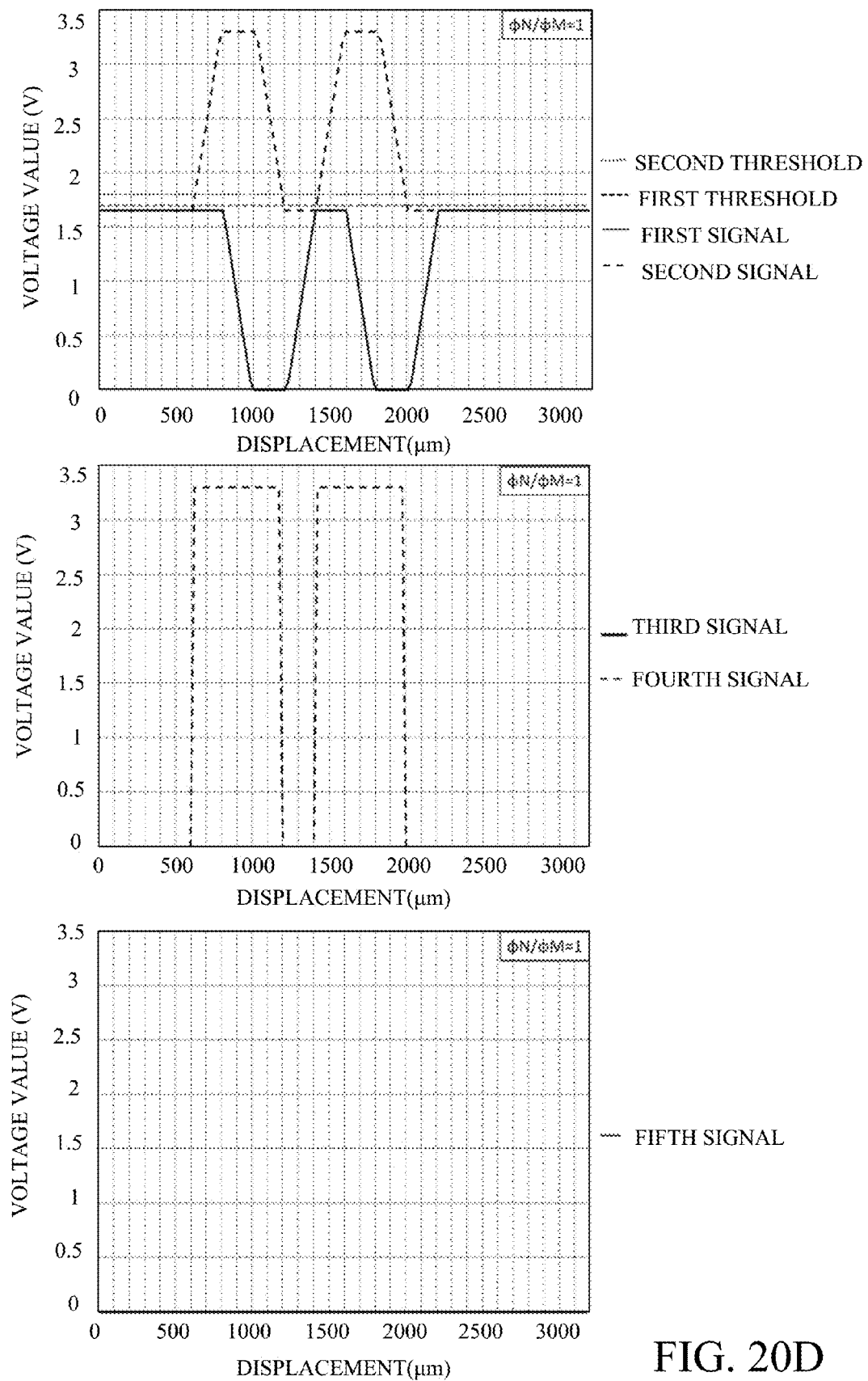
FIG. 20D is a schematic diagram illustrating a first to a fifth signals when the light receiving sensitivity ratio is 1.

FIG. 17 is a schematic diagram illustrating the light receiver 31 when the light receiving sensitivity (signal sensitivity) ratio φN/φM is ½. In FIG. 17, since light receiving sensitivity (signal sensitivity) φN of the light receiving element arranged at the peripheral part is ½ compared with FIG. 14, the light receiving sensitivity (signal sensitivity) φN/φM is ½. FIG. 18 is a schematic diagram illustrating output signal intensity of each light receiving element when the track 12 is relatively displaced, and FIG. 19 is a schematic diagram illustrating output signal intensity of each light receiving element after a differential. Since the light receiving sensitivity (signal sensitivity) ratio φN/φM of the light receiving element arranged at the peripheral part and the light receiving element arranged at the central part is ½, signal intensity variation between the point 0 and the point 4 is different from signal intensity variation between the point 4 and the point 8. The same applies to the other light receiving elements, and if signal intensities of all light receiving elements are combined, the combinations of the signal intensities become unique. For example, a range where output signal intensity VA of the light receiving element A and output signal intensity VB of the light receiving element B strengthen than output signal intensity VC of the light receiving element C and output signal intensity VD of the light receiving element D, respectively, is existed only between the point 4 and the point 6. Additionally, output signal intensities after a differential have a unique value, and a range where both differential output signal intensities V1 and V2 strengthen than 0 is existed only between the point 4 and the point 6. If this state is a condition of an origin, origin detection is performable.

Figure 21:
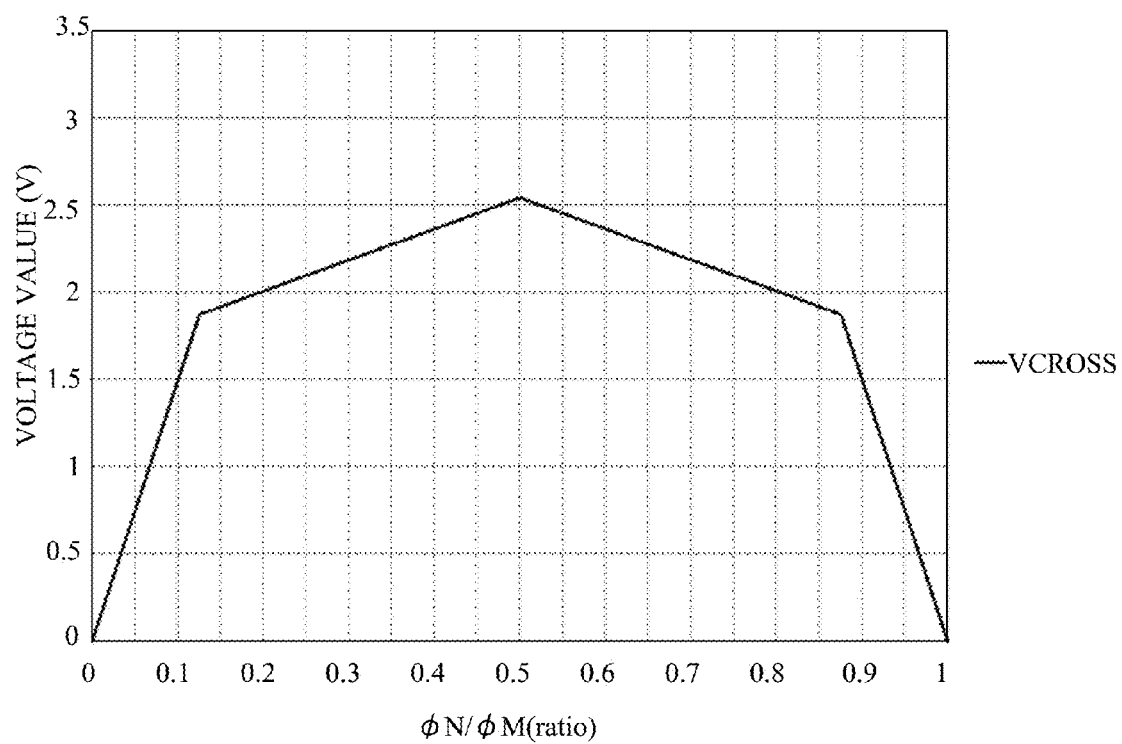
FIG. 21 is a schematic diagram illustrating a relation between the light receiving sensitivity ratio and a cross point voltage value.

FIGS. 20A to 20D are schematic diagrams illustrating a first to a fifth signals when light receiving sensitivity (signal sensitivity) ratios φN/φM are 0.25, 0.5, 0.75, and 1, respectively. In each figure, the abscissa axis denotes displacement, and the ordinate axis denotes a voltage value. As illustrated in these figures, when the light receiving sensitivity (signal sensitivity) is less than 1, there is a range where both the first and second signals is higher than the central voltage and intersection method of each signal changes according to sensitivity ratio. FIG. 21 is a schematic diagram illustrating a relation acquired from FIGS. 20A to 20D between a cross point voltage value, which is to regard as an origin by an origin signal process in the invention, and a light receiving sensitivity (signal sensitivity) ratio. In FIG. 21, the abscissa axis denotes light receiving sensitivity (signal sensitivity) ratio φN/φM, and the ordinate axis denotes a voltage value. As illustrated in FIG. 21, when the light receiving sensitivity (signal sensitivity) ratio is 0.5, the cross point voltage value is the highest. Thus, the light receiving sensitivity (signal sensitivity) is preferably 0.5, and the light receiving sensitivity (signal sensitivity) in this embodiment is ½.

Figure 22A:
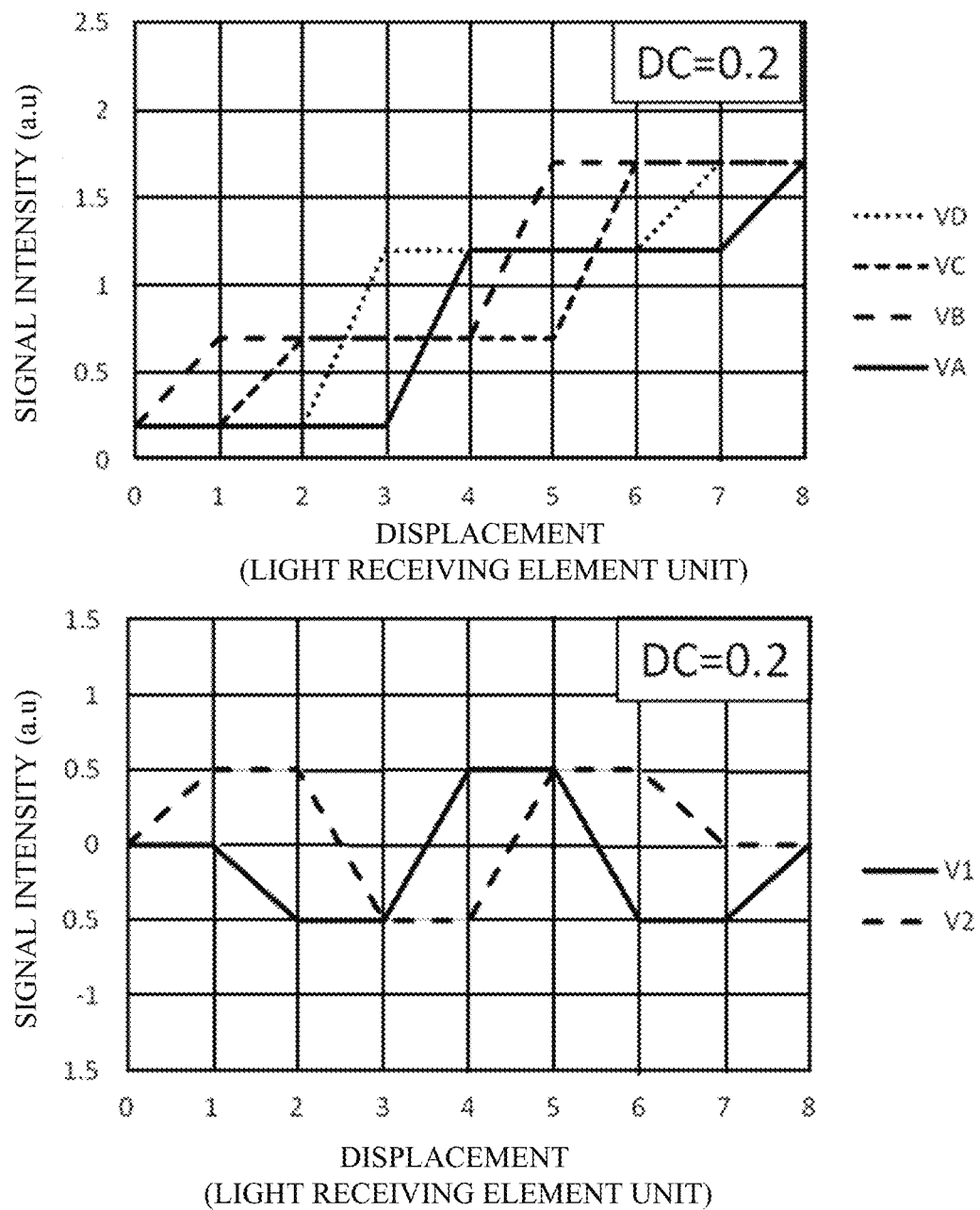
FIG. 22A is a schematic diagram illustrating signal intensity of each light receiving element and signal intensity after a differential when a uniform light is incident.
Figure 22B:
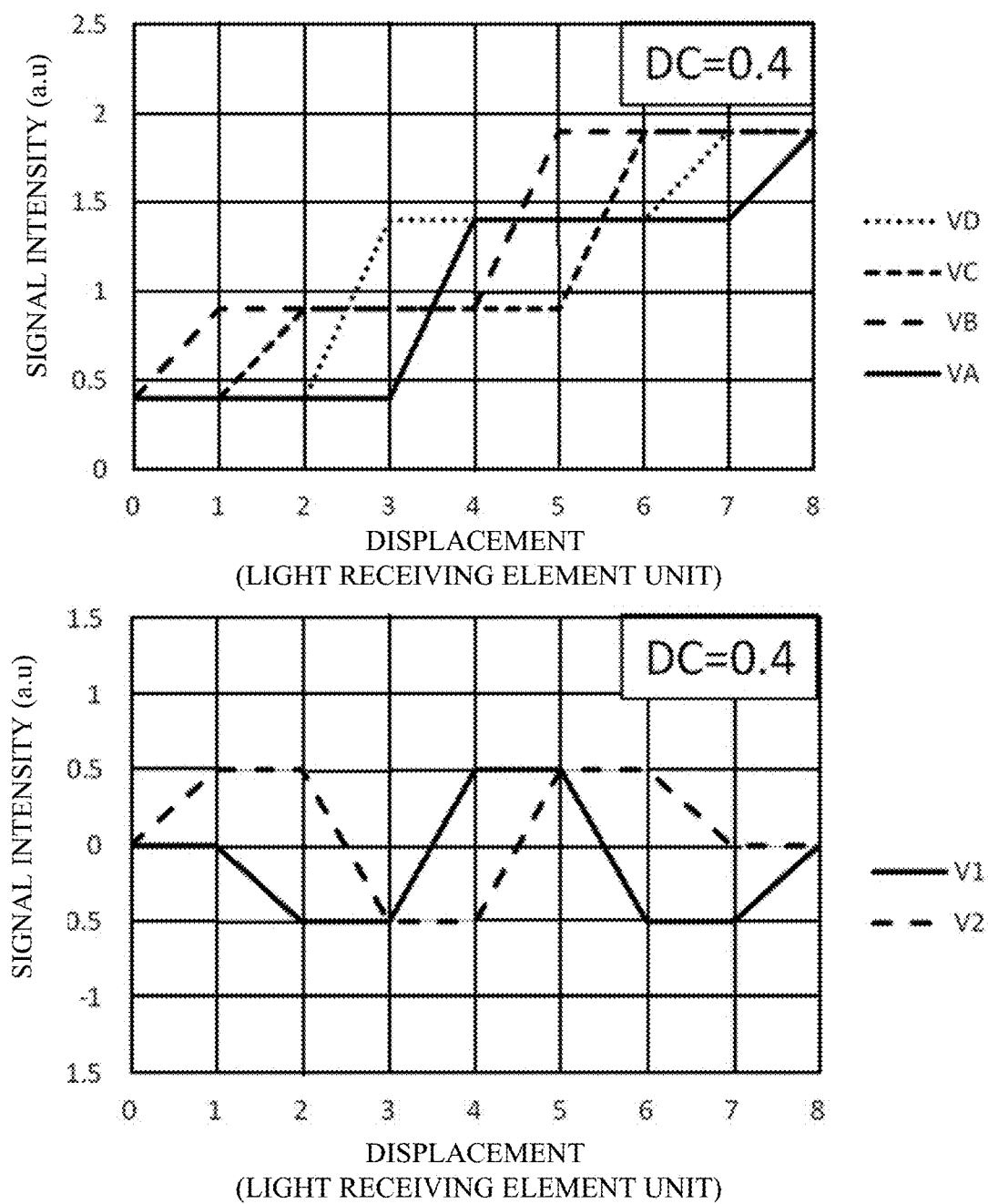
FIG. 22B is a schematic diagram illustrating signal intensity of each light receiving element and signal intensity after a differential when a uniform light is incident.

Signal variation resistance characteristic by a differential process is an effect of the invention. In an optical type encoder of this embodiment, if a light is uniformly incident to the entire light receiver 31, all light receiving elements indicate the same signal intensity. Hereinafter, the above uniform incident light is "DC light", and the same signal intensity generated by the light receiving elements is "DC component". FIG. 22A is added 0.2 of "DC component", and FIG. 22B is added 0.4 of "DC component". FIGS. 22A and 22B are schematic diagrams illustrating signal intensity of the light receiving elements A to D and signal intensity after a differential. In FIGS. 22A and 22B, the abscissa axis denotes displacement of a light receiving element unit, and the ordinate axis denotes a voltage value. In FIGS. 22A and 22B illustrating signal intensity of each light receiving element, signal intensity of each light receiving element raises by the value of the "DC component". However, in figures illustrating signal intensity after a differential, signal intensity does not vary according to changes of the value of the "DC component", and thus a signal phase also does not vary. The "DC component" added to an output voltage of each light receiving element is removed by a differential process represented by the expressions (1) and (2).

In this embodiment, preferable origin detection, which is not affected by noise, is performable by the above configuration.

In this embodiment, the reflective configuration that the displacement detecting sensor 20, the origin detecting sensor 30, and the light source 21 are arranged on the same surface, and displacement and an origin position are detected by receiving the reflected light from the scale 10 will be described. However, the present invention is capable of applying to the transmissive configuration that each sensor is provided on a plane different from a plane on which the light source 21 is provided and the scale 10 is provided between the light source 21 and each sensor.

Additionally, in this embodiment, a sensor different from the origin detecting sensor for displacement detection is used. Since the configuration of the origin detecting sensor is the same configuration as the displacement detecting sensor except for an arrangement number of the light receiving element array group in this embodiment, the origin detecting sensor of the invention may be used for displacement detection.

Moreover, an origin detection process is performed using the circuit in this embodiment, but may be performed using a software if a signal similar to the fifth signal can be acquired.

Embodiment 2

Figure 23:
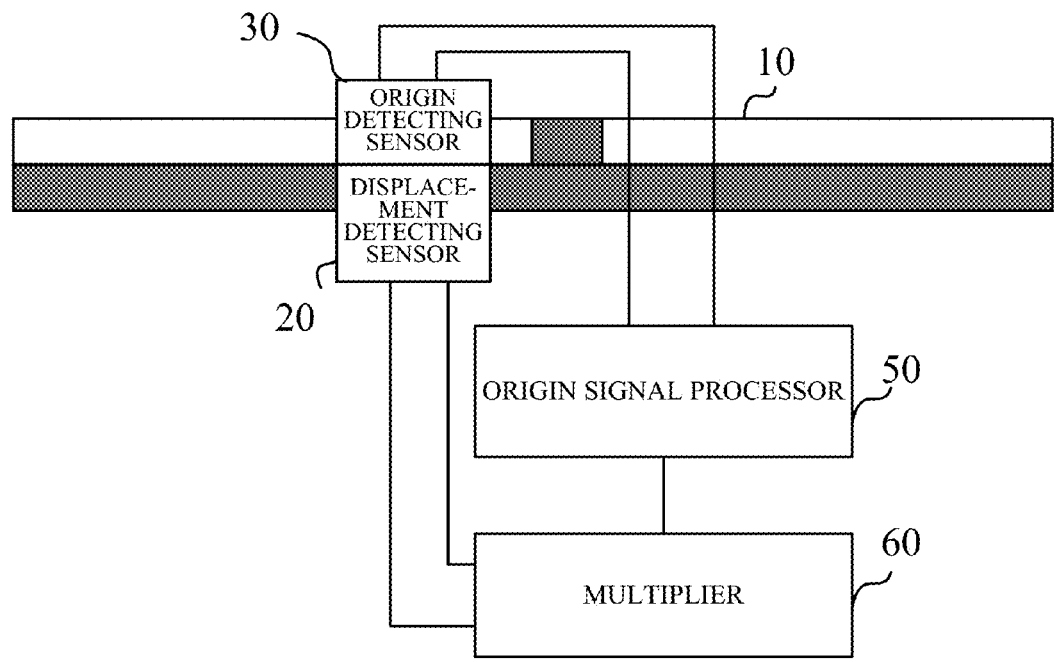
FIG. 23 is a schematic diagram illustrating a configuration of an encoder according to Embodiment 2.
Figure 24:
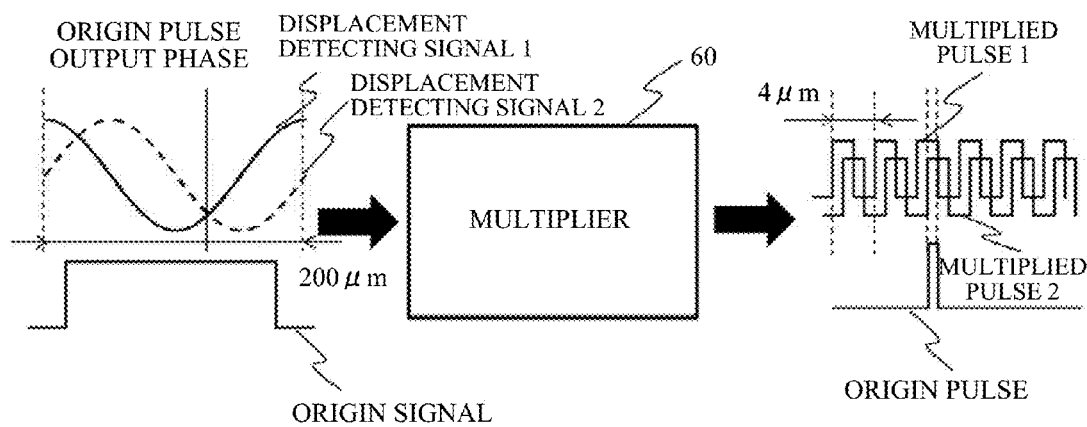
FIG. 24 is a schematic diagram relating to an operation of a multiplier.

In this embodiment, a multiplier 60 is used instead of the displacement detecting signal processor 40 of Embodiment 1. FIG. 23 is a schematic diagram illustrating a configuration of an encoder in this embodiment. Additionally, FIG. 24 is a schematic diagram relating to an operation of the multiplier. The method of origin detecting process is the same as Embodiment 1.

In FIG. 24, the multiplier 60 outputs digital signals, which are 50-divided displacement detecting signals 1 and 2, as multiplied pulses 1 and 2. Pulse length of each multiplied pulse is then 4 μm. An origin pulse synchronizes with edges of the multiplied pulses 1 and 2, and is output at an origin pulse output phase when an origin signal is input. The origin pulse output phase is a phase where the displacement detecting signals 1 and 2 are the same at a low voltage side from the central voltage.

Figure 25:
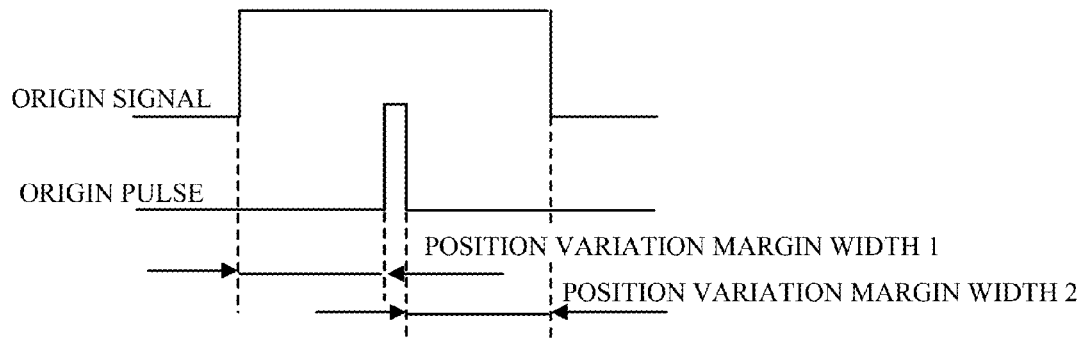
FIG. 25 is a schematic diagram illustrating a relation among an origin signal, an origin pulse, and a position variation margin width.
Figure 25:
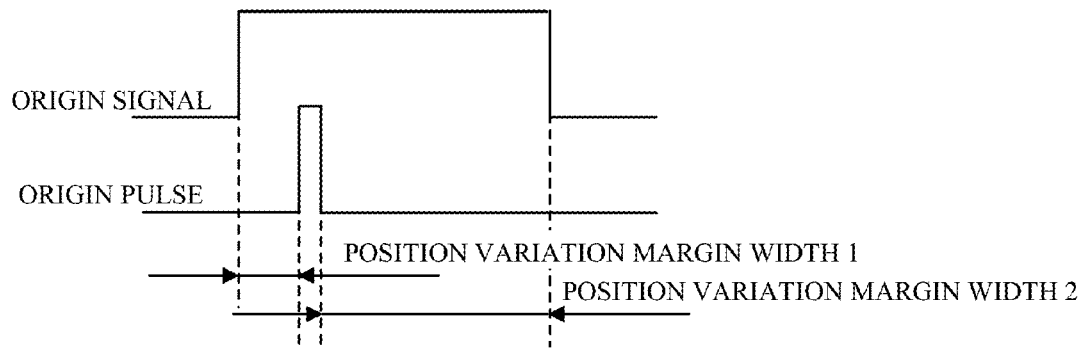

FIG. 25 is a schematic diagram illustrating a relation among the origin signal, the origin pulse, and position variation margin width. In FIG. 25, when the origin pulse output phase rises at the center of the raised origin signal, the position variation margin widths 1 and 2 are almost the same. This means having the same resistance characteristics relative to position variations in both directions. Meanwhile, when the origin pulse output phase is localized relative to the raised the origin, a resistance of the position variation margin width 1 is inferior compared to the position variation margin width 2. This means that the displacement detecting sensor 20 and the origin detecting sensor 30 have position variation margins localizing in one direction.

A way of dealing with phase differences between an output phase of the displacement detecting sensor 20 and an origin signal output from the origin signal processor 50 will be described. The origin pulse output phase is localized relative to the raised origin signal because the position variation margin width decreases by the phase differences. As a result, the origin pulse is not output at desired position.

In this embodiment, an output position of the origin signal relative to the origin pulse output phase is adjusted. The raised width of the fifth signal, which is the original signal, is determined by the first and second thresholds. For example, if a signal having 100 μm of the raised width is acquired, the first and second thresholds may be an intermediate value between the central voltage and the cross point voltage. Because the phase differences between the first and second signals determined by the arrangement of the light receiving elements are always 200 μm at the central voltage, decreases by setting larger thresholds from the central voltage, and becomes 0 at an intersectional position where the first and second signals intersect. Since the first and second signals are linear from the central voltage to the cross point voltage, a relation between the origin signal pulse width and the threshold is represented as the following expression (8). λ represents the origin signal pulse width, and X represents the phase differences between the first and second signals at the central voltage. For simplification, Vref1=Vref2=Vref and Voffset1=Voffset2=Voffset are satisfied.

$$\lambda = X \times \frac{Vcross - Vref}{Vcross - Voffset} \quad (8)$$

Figure 26A:
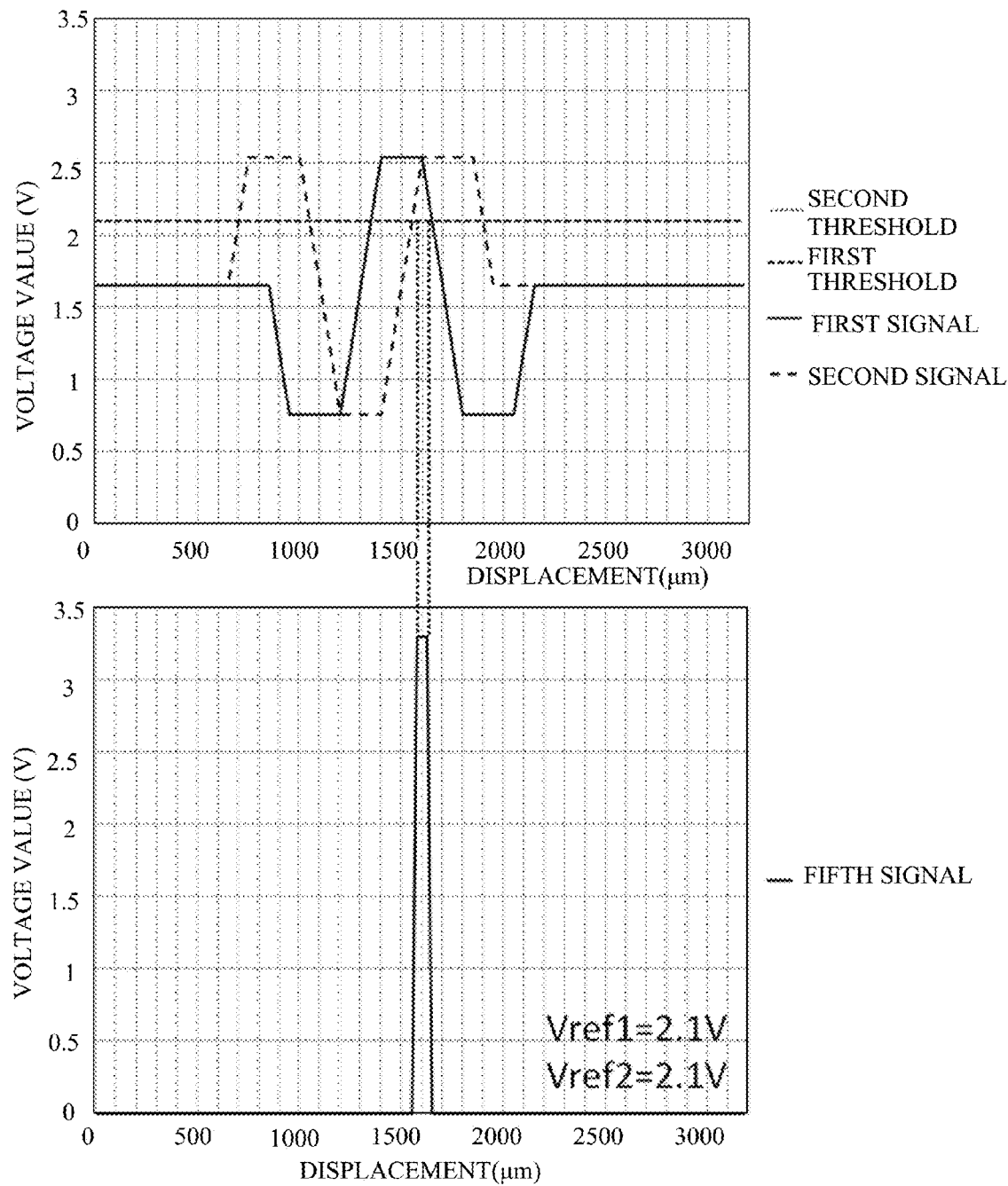
FIG. 26A is a schematic diagram illustrating a first signal, a second signal, and a fifth signal if a first threshold is equal to a second threshold.
Figure 26B:
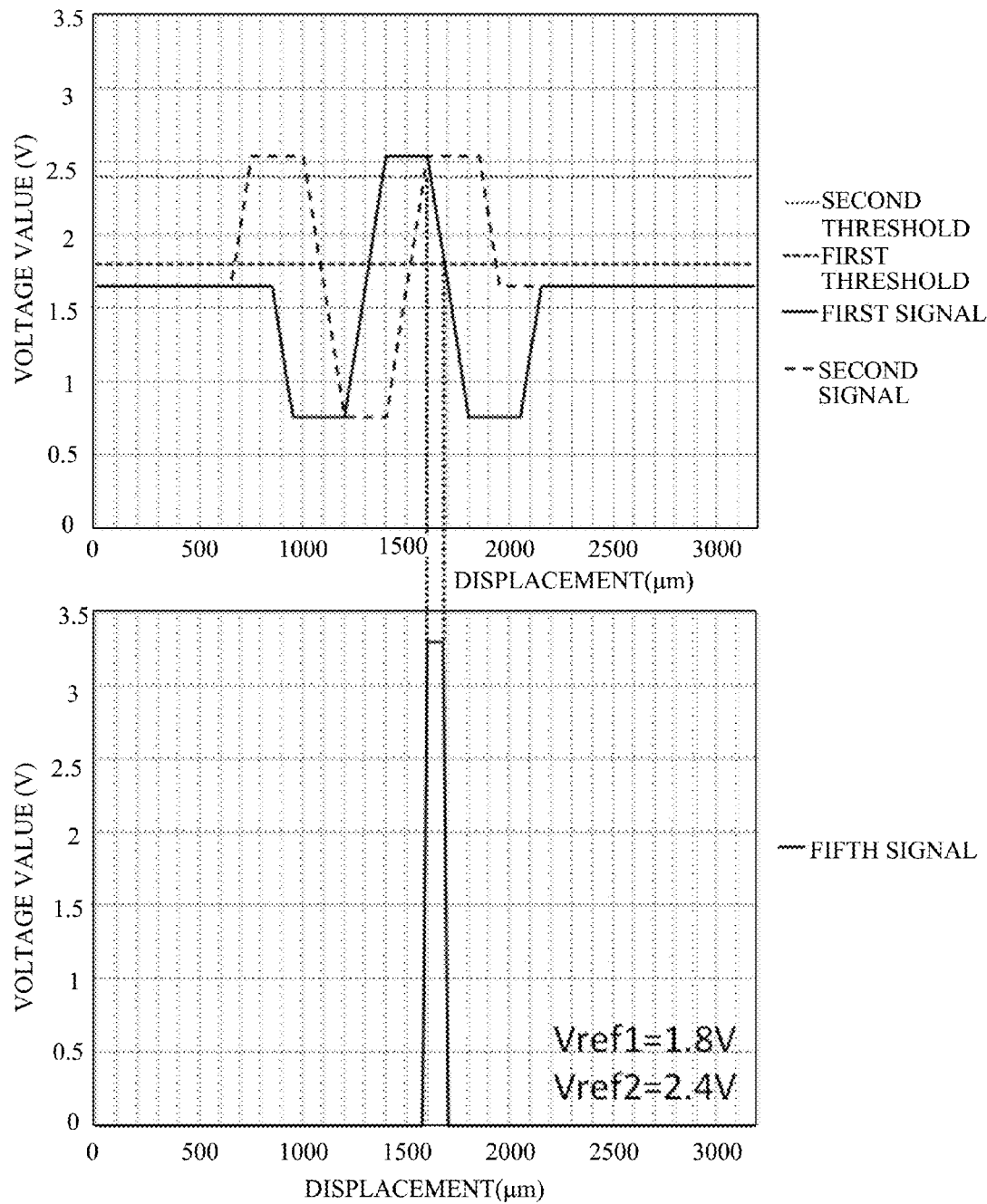
FIG. 26B is a schematic diagram illustrating a first signal, a second signal, and a fifth signal if a first threshold is on a low voltage side and a second threshold is on a high voltage side.
Figure 26C:
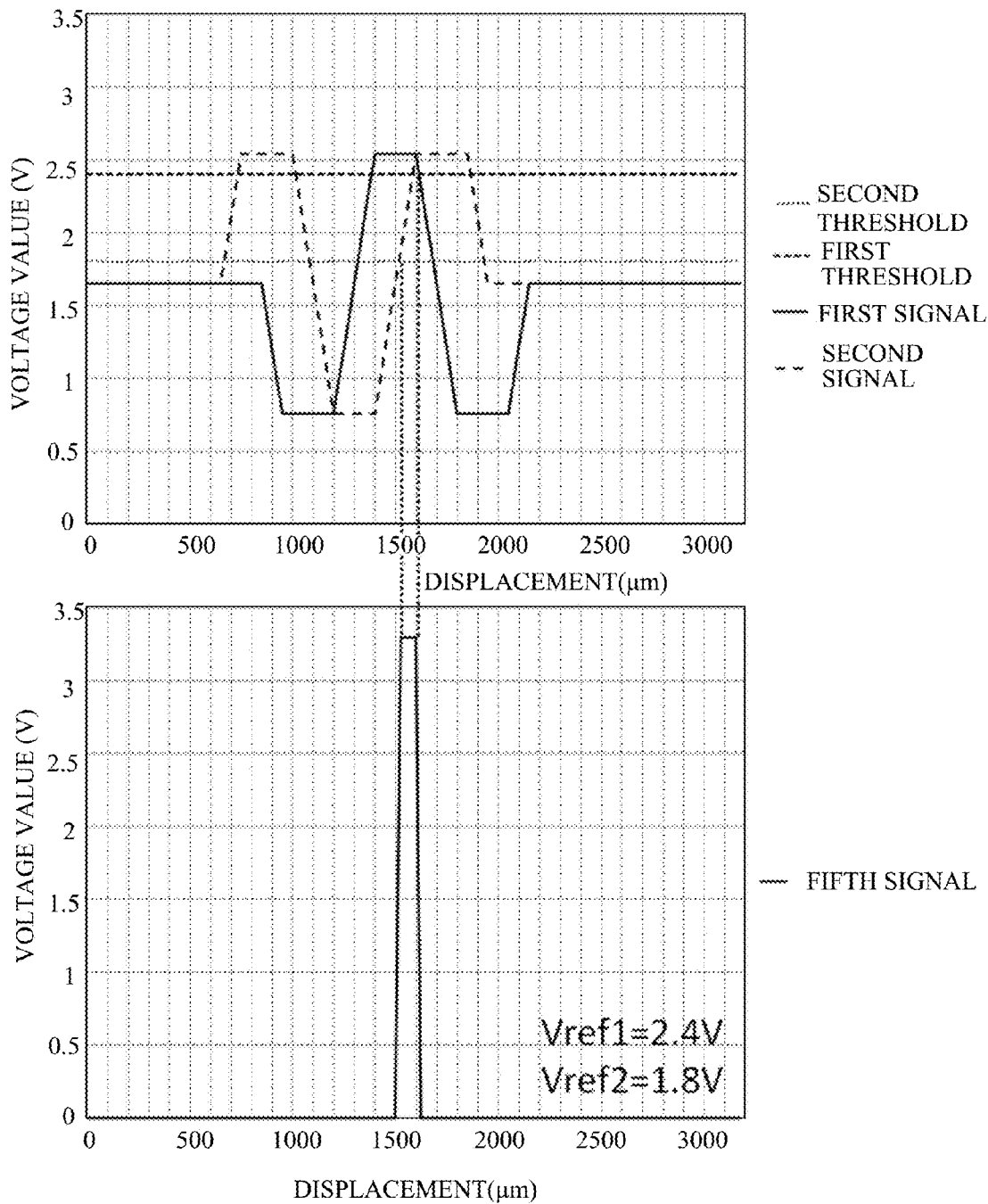
FIG. 26C is a schematic diagram illustrating a first signal, a second signal, and a fifth signal if a first threshold is on a high voltage side and a second threshold is on a low voltage side.

When position of the fifth signal, which is the origin signal, is adjusted in this configuration, the first and second thresholds, which are respectively thresholds of the first and second signals, are individually reversely varied. FIGS. 26A to 26C are schematic diagrams illustrating the first, second, and fifth signals when the first and second thresholds are changed from the state that the first threshold is equal to the second threshold. For example, when the origin position moves to the right (from the state of FIG. 26A to the state of FIG. 26B), the first and second thresholds Vref1 and Vref2 are changed to the low voltage side and the high voltage side, respectively. Conversely, when the origin position moves to the left (from the state of FIG. 26A to the state of FIG. 26C), the first and second thresholds are changed to the high voltage side and the low voltage side, respectively. An absolute value of a change of each threshold may be then equivalence. When the absolute values of a change of the thresholds differ from each other, the origin signal width decreases or increases in width compared to the origin signal width of Vref1=Vref2.

When the origin position, where Vref1=Vref2=Vref is satisfied, is an initial position, an adjustment width ΔOrg of the origin position is represented by the following expression (9).

$$\Delta Org = \begin{cases} \pm \frac{\lambda}{2} & Incaseof: Vcross - Vref \leq Vref - Voffset \\ \pm \frac{X - \lambda}{2} & Incaseof: Vcross - Vref > Vref - Voffset \end{cases} \quad (9)$$

Further, in light of a central voltage fluctuation factor Vom and a cross point voltage fluctuation factor vcm, the expression (9) is rewritten to the following expression (10).

$$\Delta Org = \begin{cases} \pm \frac{\lambda}{2}\left(1 - \frac{Vcm}{Vcross - Vref}\right) & Incaseof: Vcross - Vref < Vref - Voffset \\ \pm \frac{\lambda}{2}\left(1 - \frac{Vcm}{Vcross - Vref} - \frac{Vom}{Vref - Voffset}\right) & Incaseof: Vcross - Vref = Vref - Voffset \\ \pm \frac{X - \lambda}{2}\left(1 - \frac{Vom}{Vref - Voffset}\right) & Incaseof: Vcross - Vref > Vref - Voffset \end{cases} \quad (10)$$

From the above configuration, since the output position of the origin signal is adjustable even if the multiplier 60 is connected, the origin detecting process of the invention is applied to the system outputting the origin pulse using the origin signal synchronized to the displacement detecting signal. The invention according to this embodiment is also applied to the system where the signal detecting configuration and the processing configuration are separately provided as Embodiment 1.

Embodiment 3

Figure 27:
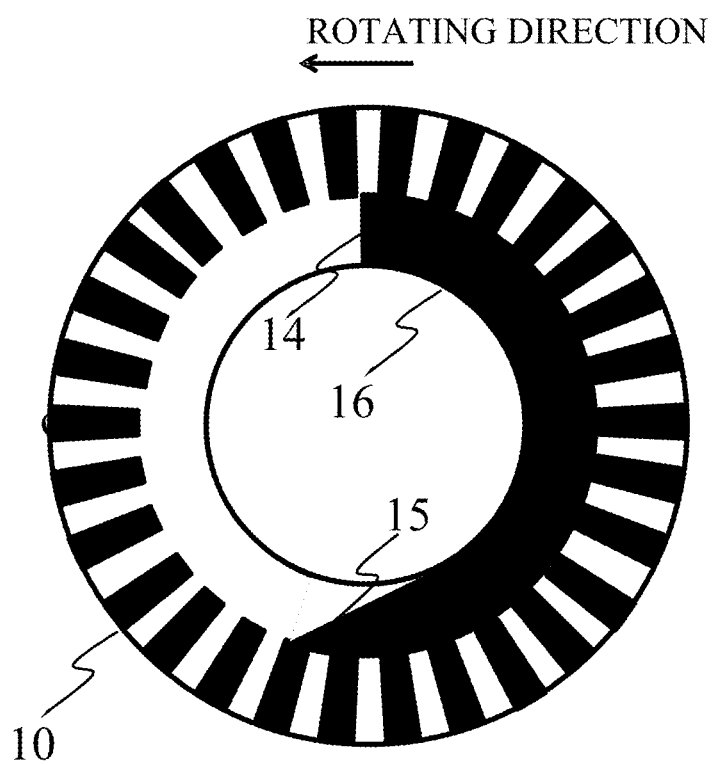
FIG. 27 is a schematic diagram illustrating a rotary scale according to Embodiment 3.

An encoder of this embodiment includes a scale 10, a displacement detecting sensor 20, an origin detecting sensor 30, a displacement detecting signal processor 40 and an origin signal processor 50 as Embodiment 1. However, this embodiment is different from Embodiment 1 in that the scale 10 is a rotary scale. The rotary scale in this embodiment is illustrated in FIG. 27. In each track of FIG. 27, black parts are a reflecting part and the other parts are a non-reflecting part. In FIG. 27, an outside track is used for displacement detection, and an inside track is used for origin detection. 30 periods of the pattern for displacement detection is formed over the whole circumference, and a length of the pattern for origin detection corresponds to 17 periods of the pattern for displacement detection. Resolution of the displacement detecting sensor 20 is 200 μm, and a pattern length of the pattern for origin detection corresponds to 3400 μm of a displacement detecting signal, which the displacement detecting sensor reads. A length in a detecting direction of a reflected image, which reflected light from the pattern for the origin detection forms on the detecting surface of the origin detecting sensor 30, corresponds to 6800 μm of the displacement detecting signal, and is fully larger than a length in a detecting direction of the detecting element array of the origin detecting sensor 30. Moreover, the pattern for origin detection of the inside track doubles with the pattern for region determination in this embodiment. A first end part 14 and a second end part 15 of the pattern for origin detection 16 differ in form. A pattern boundary of the first end part 14 is perpendicular to the detecting direction, and a pattern boundary of the second part 15 slopes relative to the detecting direction. The first end part 14 is set as an origin position in this embodiment.

Figure 28:
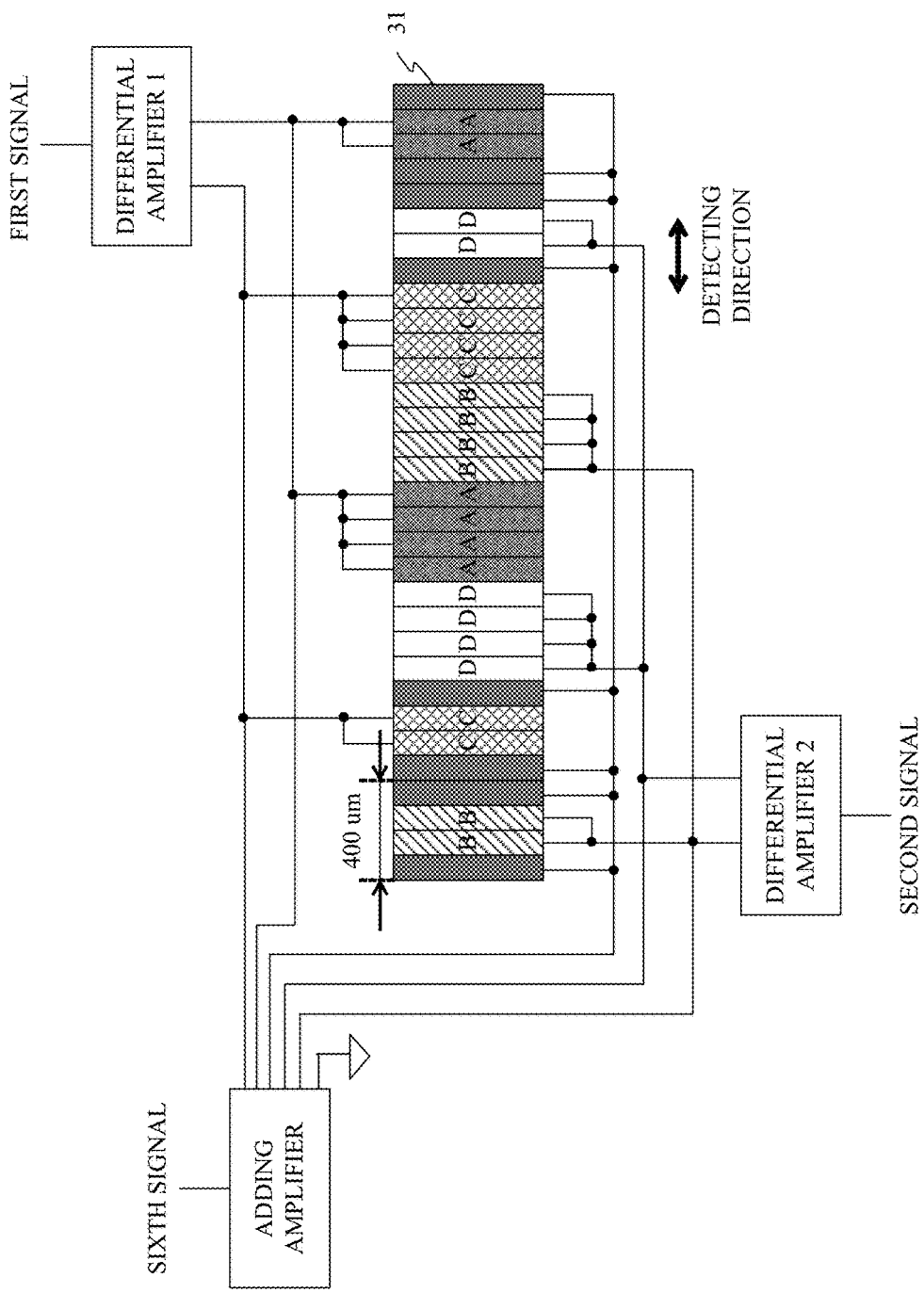
FIG. 28 is a schematic diagram illustrating detecting blocks of an origin detecting sensor according to Embodiment 3.
Figure 29:
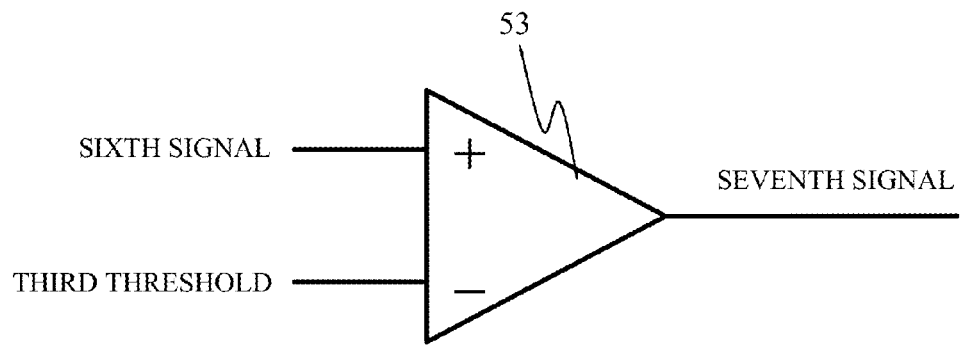
FIG. 29 is a schematic diagram illustrating a region determining circuit of an origin detecting processor according to Embodiment 3.

The encoder according to this embodiment includes a region detector to detect the scale in a region relative to the detecting direction in addition to the origin detector of Embodiment 1. FIGS. 28 and 29 are respectively an origin detecting system and a region determining process circuit to perform a region determining process according to this embodiment. The origin detecting system according to this embodiment is mostly the same as the origin detecting system according to Embodiment 1 as illustrated in FIG. 28, but is different from the origin detecting system according to Embodiment 1 in that the origin detecting system according to this embodiment has an adding amplifier to sum signals from all detecting elements including the first to fourth detecting elements and the other detecting elements. Hereinafter, the sum signal, which is an average of signals output from the adding amplifier, is referred to as "sixth signal". Moreover, the circuit of FIG. 29 generates the region determining signal from the sixth signal. The circuit has a third threshold to be compared with the sixth signal, outputs a low level signal when the sixth signal is smaller than the third threshold and a high level signal when the sixth signal is larger than the third threshold.

Figure 30:
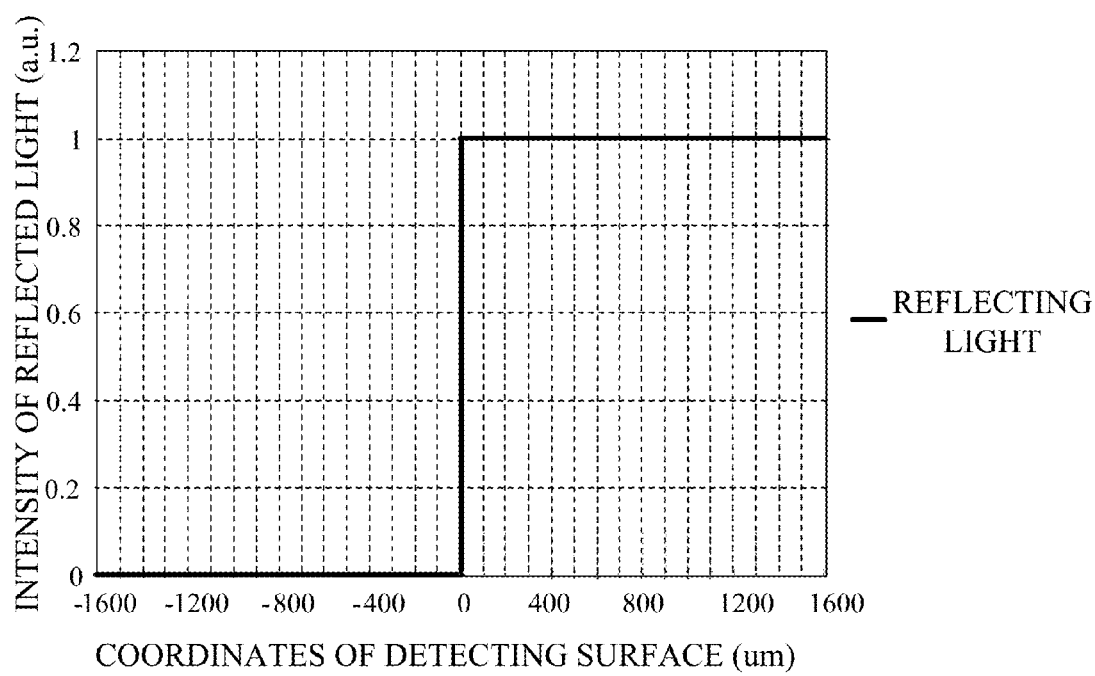
FIG. 30 is a schematic diagram illustrating intensity of a reflected light from a first end part of an origin detecting pattern at a detecting surface of the origin detecting sensor.
Figure 31:
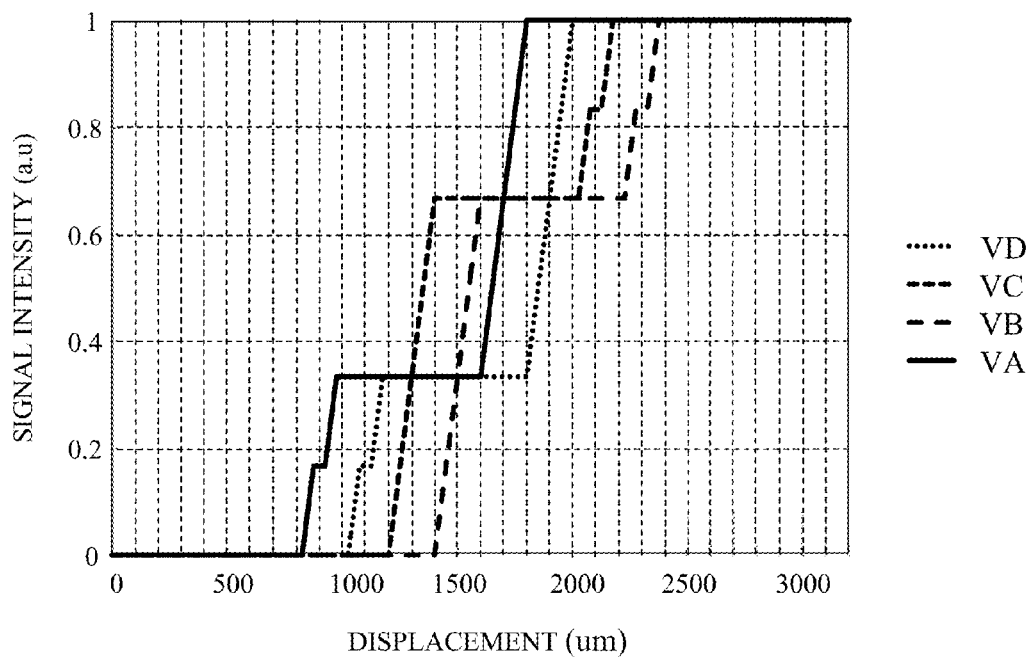
FIG. 31 is a schematic diagram illustrating output signal intensity from each detecting element when the reflected light from the first end part of the origin detecting pattern is received.
Figure 32:
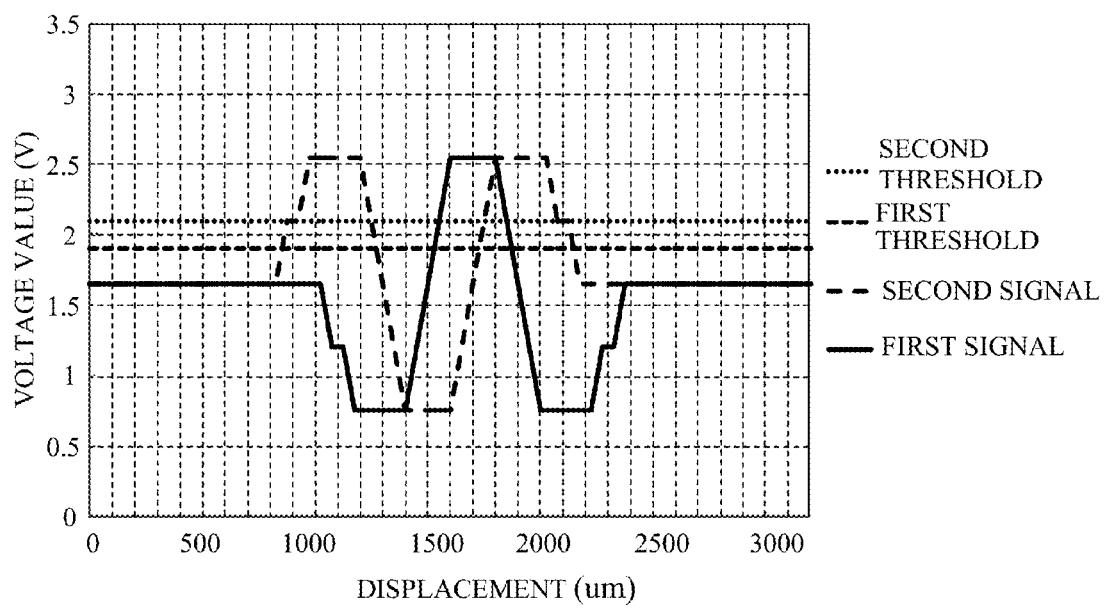
FIG. 32 is a schematic diagram illustrating a first signal, a second signal, a first threshold, and a second threshold when the reflected light from the first end part of the origin detecting pattern is received.
Figure 33:
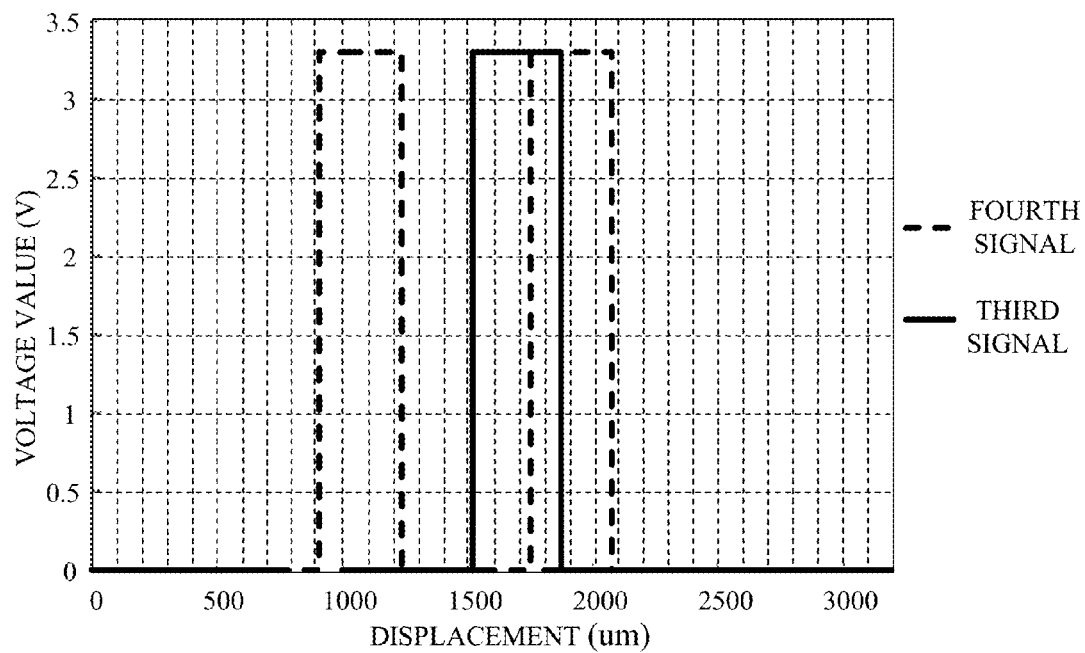
FIG. 33 is a schematic diagram illustrating a third signal and a fourth signal when the reflected light from the first end part of the origin detecting pattern is received.
Figure 34:
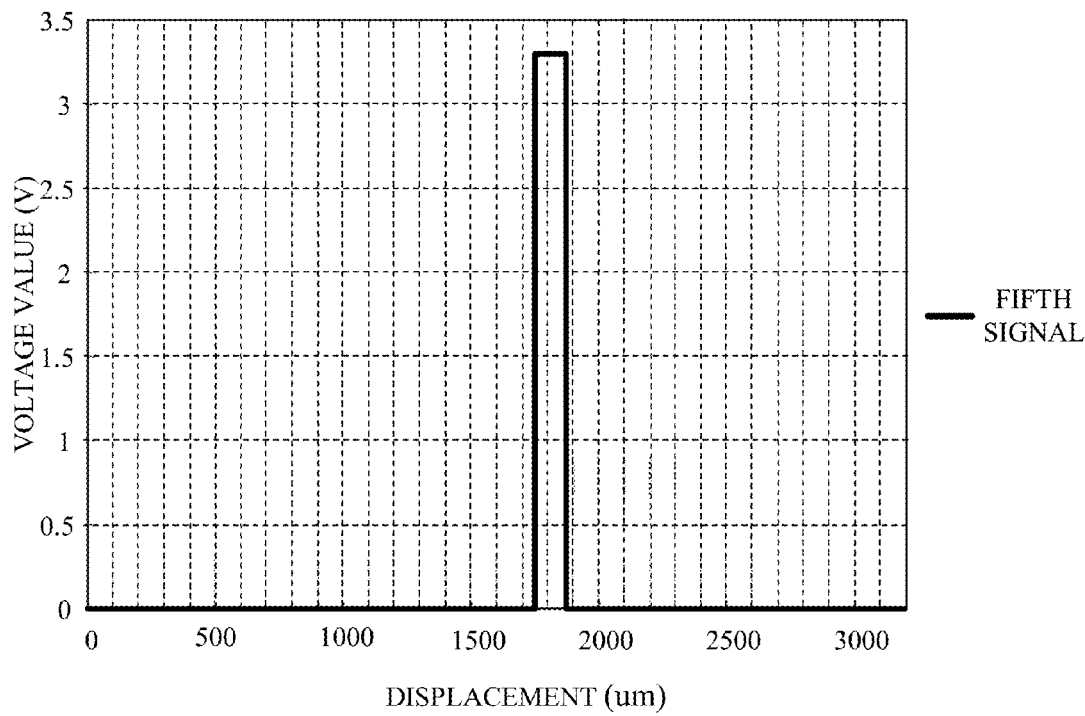
FIG. 34 is a schematic diagram illustrating a fifth signal when the reflected light from the first end part of the origin detecting pattern is received.

FIG. 30 is a schematic diagram illustrating intensity of a reflected light from the first end part 14 at the detecting surface. In FIG. 30, a coordinate 0 represents a center of the detector of the origin detecting sensor 30, and coordinates −1600 and 1600 are end parts of the detecting part. The first end 14, which is boundary to change the pattern for origin detection 16 from the non-reflecting part to the reflecting part (or the reflecting part to the non-reflecting part), is a sharp edge perpendicular to the detecting direction, and thus the reflected light from the first end part 14 of the pattern for origin detection 16 is a sharp signal. FIGS. 31 to 34 illustrates signals of the detecting elements, the first and second signals and the first and second thresholds, the third and fourth signals, and the fifth signal when the detector detects this signal. The abscissa axis denotes moving amounts detected at the detected surface by the origin detecting sensor 30, which is converted from the rotation of the rotary scale. The contents of the above figures, the processing method, and the origin detecting method are the same as Embodiment 1, and thus these descriptions are omitted. Moreover, in figures that are later described, if there is no special description regarding the abscissa axis, the abscissa axis denotes moving amounts detected at the detected surface by the origin detecting sensor 30, which is converted from the rotation of the rotary scale.

Figure 35:
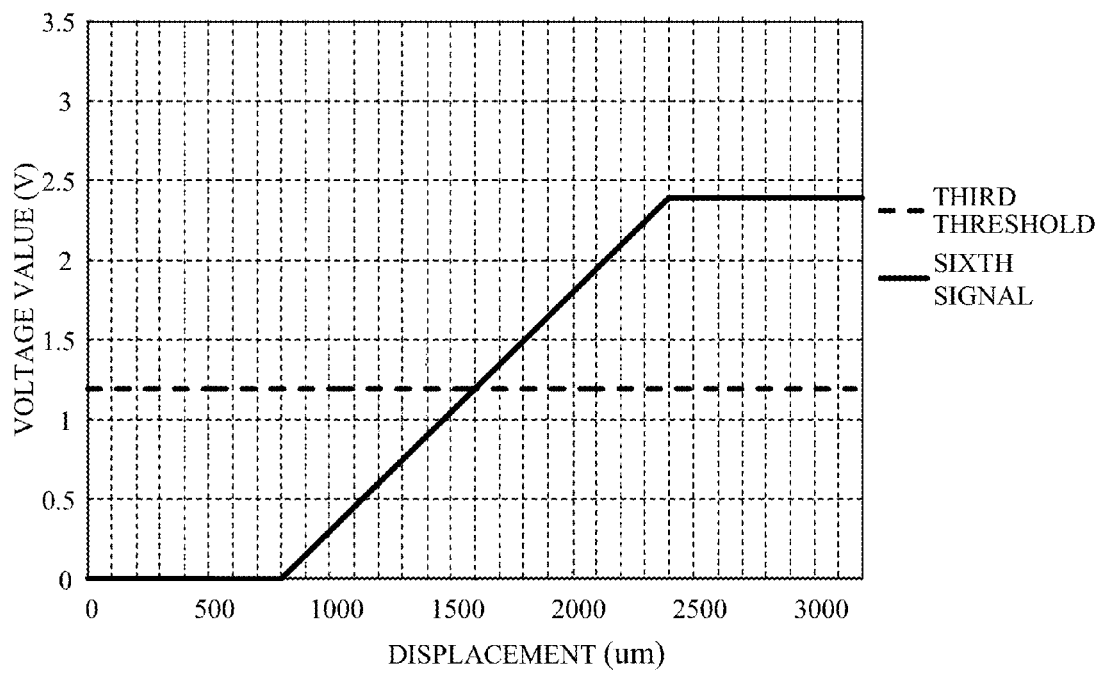
FIG. 35 is a schematic diagram illustrating a sixth signal and a third threshold when the reflected light from the first end part of the origin detecting pattern is received.

FIG. 35 is a schematic diagram illustrating the sixth signal and the third threshold. In FIG. 35, the ordinate axis denotes voltage values. The pattern for origin detection has the pattern length larger than the detector of the origin detecting sensor 30. Thus, a length in the detecting direction of a reflected image, which is formed at the detected surface by the reflected light from the pattern for origin detection, gradually elongates when the reflected light from the first end part 14 starts to enter the detected surface, and is saturated when the detected surface is fully covered with the reflected light. This means that reflected light quantity on the detected surface is gradually larger and is saturated when the detected surface is fully covered. Since the signal intensity from the detected elements is proportional to the reflected light quantity, the sixth signal, which is the sum signal from the adding amplifier in the configuration of FIG. 28, is gradually larger from 0V when the pattern for origin detection starts to enter and is saturated to 2.4V when the reflected light fully covers the detected surface. The third threshold is 1.2V acquired from a central point between 2.4V, which is a saturation voltage value of the sixth signal, and 0V. The third threshold is not limited to this value, and may be a voltage value capable of detecting a signal variation of the sixth signal. However, variations of the reflected light quantity from the pattern for origin detection varies the total amount of the light quantity received by the detector of the origin detecting sensor 30 and the saturation voltage value of the sixth signal. Thus, setting the third threshold to a middle voltage value between the saturation voltage value and 0V can always suppress phase changes of a seventh signal described using FIG. 36.

Figure 36:
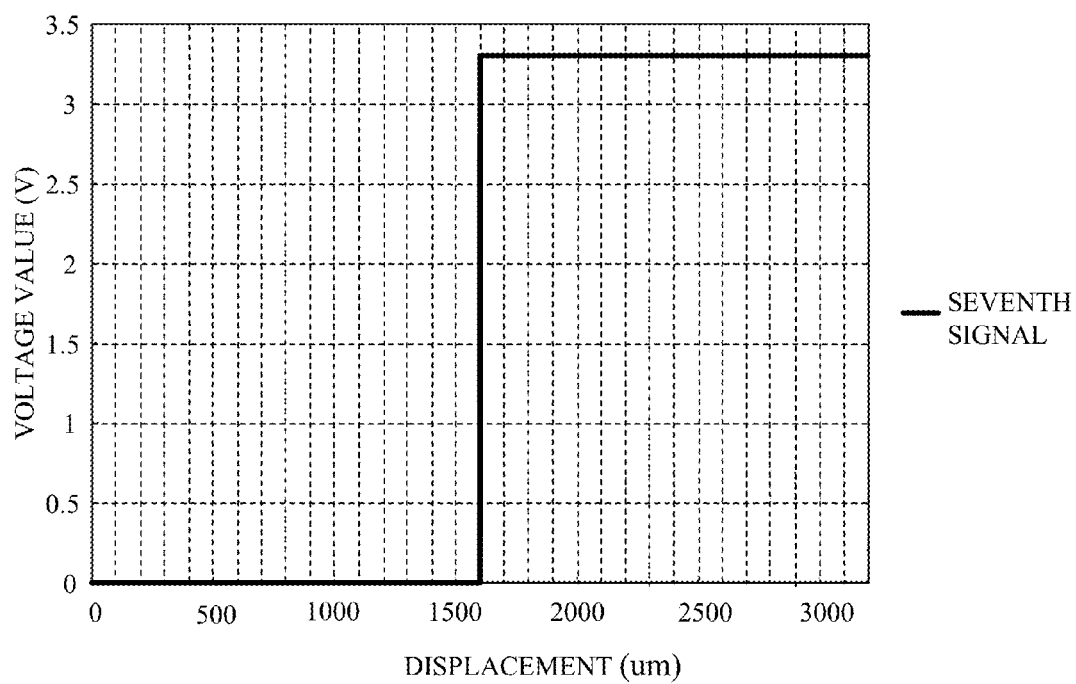
FIG. 36 is a schematic diagram illustrating a seventh signal when the reflected light from the first end part of the origin detecting pattern is received.

FIG. 36 is a schematic diagram illustrating the seventh signal acquired by processing the sixth signal and the third threshold. The ordinate axis of FIG. 36 is the same as that of FIG. 35, and thus descriptions are omitted. The seventh signal of FIG. 36 clears relative positional relation between the origin detecting sensor 30 and the pattern for origin detection. If the seventh signal is low level signal, the first end part 14 does not pass the origin detector of the origin detecting sensor 30 or starts to pass it. If the seventh signal is high level signal, the first end part 14 is before finishing passing the origin detector or after passing it. In other words, it is determined whether the origin detecting sensor 30 reads the reflecting part of the pattern for origin detection or the non-reflecting part thereof.

Figure 37:
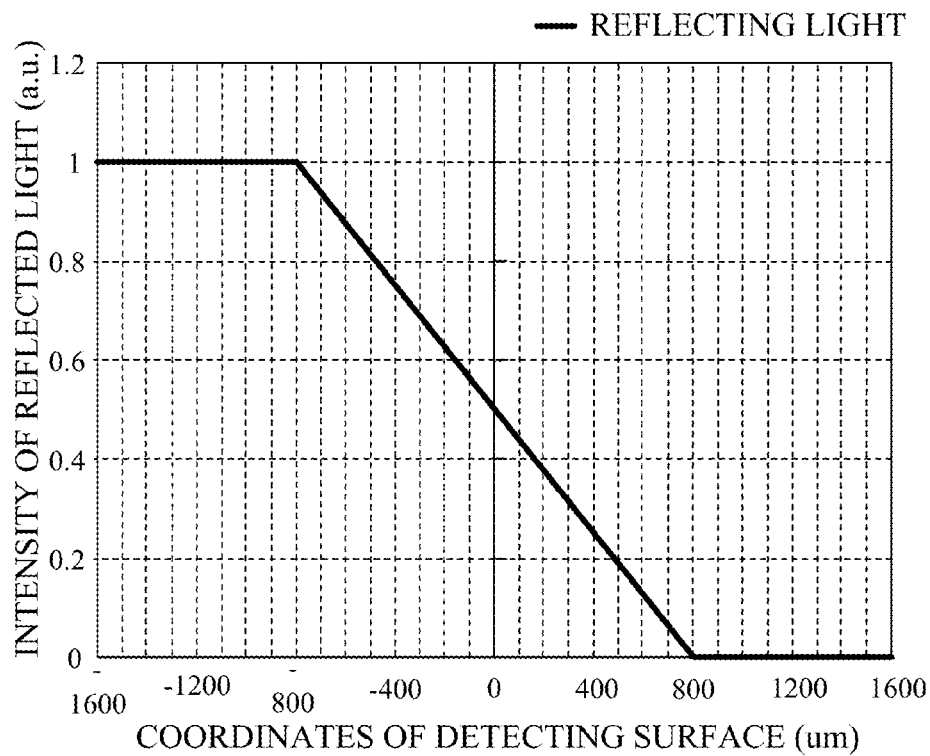
FIG. 37 is a schematic diagram illustrating intensity of a reflected light from a second end part of an origin detecting pattern at the detecting surface of the origin detecting sensor.

FIG. 37 is a schematic diagram illustrating intensity on the detected surface of the reflected light from the second end part 15. The ordinate axis of FIG. 37 is the same as that of FIG. 30, and thus descriptions are omitted. The boundary of the second end part 15 inclines relative to the detecting direction, and intensity signal on the detected surface of the reflected image also gradually weakens along the detecting direction. The first and second end parts 14 and 15 are arranged to face each other in the rotary scale. Thus, the rotation in the rotating direction defined in FIG. 27 of the rotary scale changes intensity of the reflected light from the first end part 14 from low to high along the detecting direction. Meanwhile, intensity of the reflected light from the second end part 15 changes from high to low along the detecting direction. In this embodiment, the second end part 15 has angles of inclination so that intensity of the reflected light varies during ½ of a length in the detecting direction of the detector. The relation between the angle of inclination and a length, in which intensity of the reflected light is changed, is represented by the following expression (11).

$$\theta = \tan^{-1}\left(\frac{Sx}{Sy}\right) \quad (11)$$

In the expression (11), Sx is a length in which intensity of the reflected light changes, and Sy is a length in a direction perpendicular to the detecting direction of the detecting element of the origin detecting sensor 30.

Figure 38:
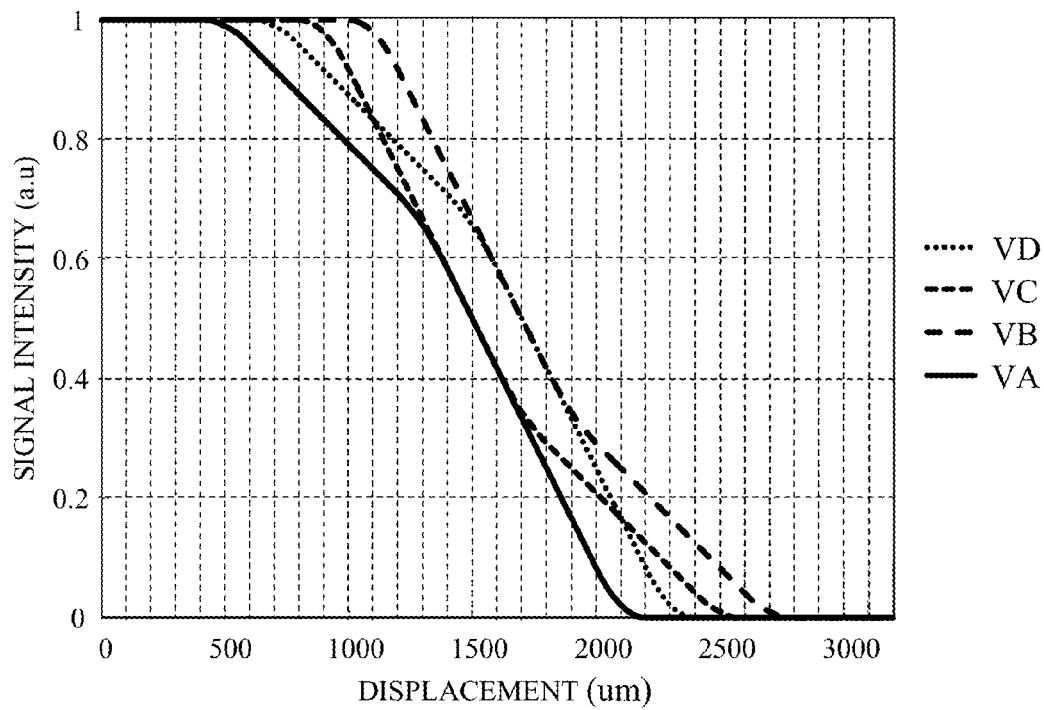
FIG. 38 is a schematic diagram illustrating output signal intensity from each detecting element when the reflected light from the second end part of the origin detecting pattern is received.
Figure 39:
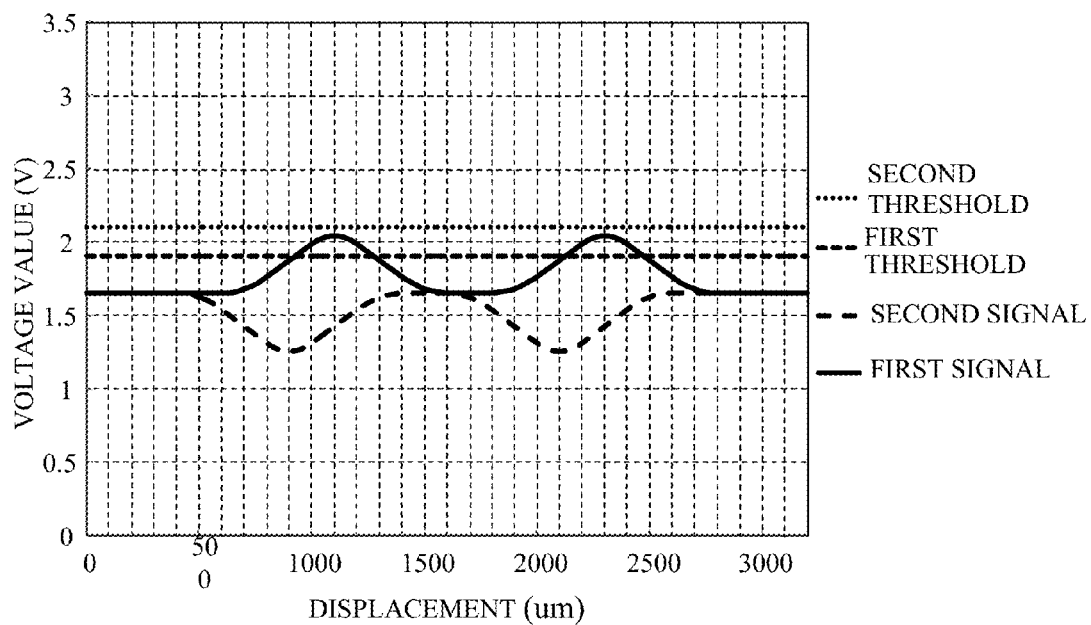
FIG. 39 is a schematic diagram illustrating a first signal, a second signal, a first threshold, and a second threshold when the reflected light from the second end part of the origin detecting pattern is received.
Figure 40:
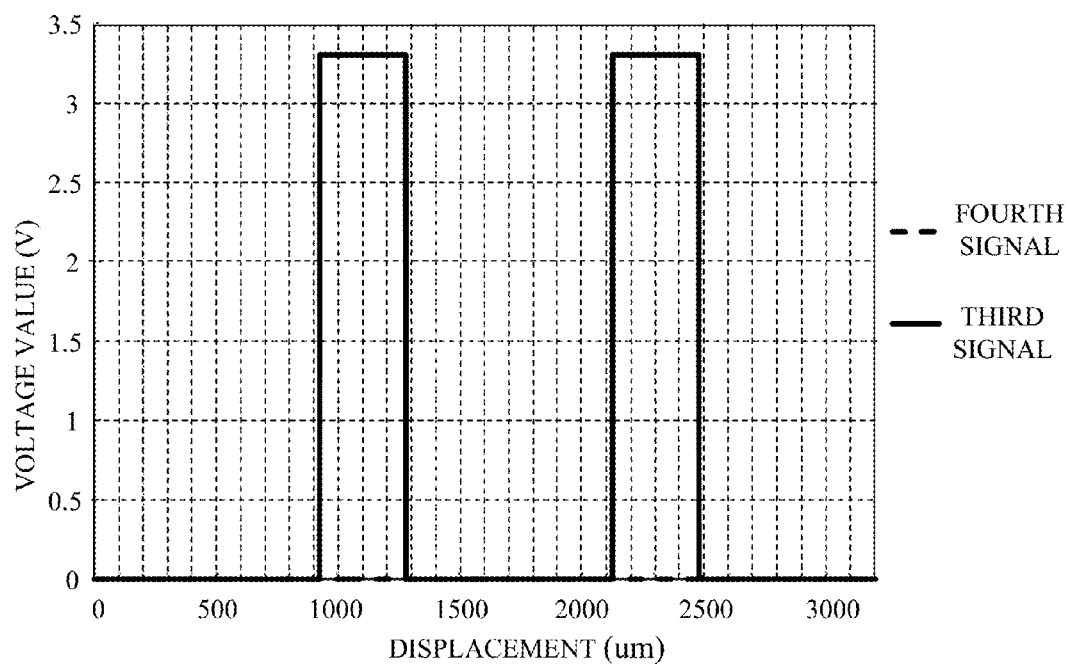
FIG. 40 is a schematic diagram illustrating a third signal and a fourth signal when the reflected light from the second end part of the origin detecting pattern is received.
Figure 41:
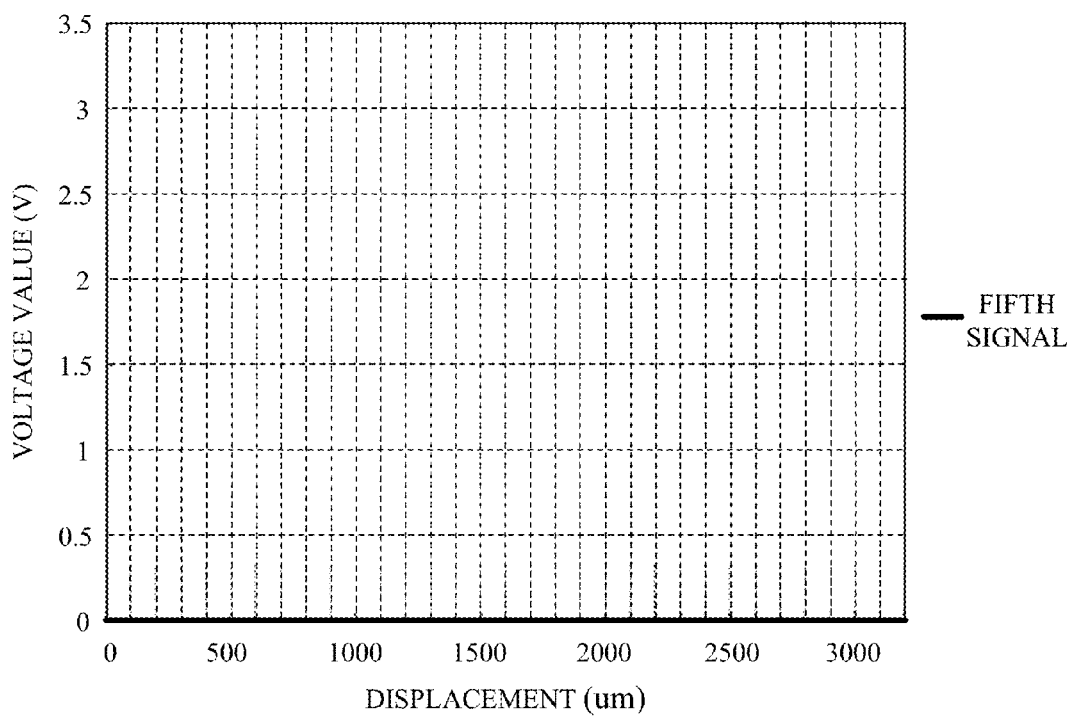
FIG. 41 is a schematic diagram illustrating a fifth signal when the reflected light from the second end part of the origin detecting pattern is received.

FIG. 38 is a schematic diagram illustrating output signal intensity from light receiving elements A to D. In FIG. 38, the ordinate axis denotes signal intensity. In FIG. 38, VA and VC, which are differential relations, have the same strong intensities before the reflected light from the second end part 15 of the pattern for origin detection passes the origin detecting sensor 30, and becomes VA<VC when the reflected light from the second end part 15 starts to pass the origin detecting sensor 30. Their signal intensities are the same when the reflected light from the second end part 15 enters to the center of the detector of the origin detecting sensor 30, subsequently, are VA<VC again, and are the same weak intensities after the second end part 15 finishes passing the origin detecting sensor 30. Meanwhile, VB and VD, which are differential relations, have the same strong intensities before the reflected light from the second end part 15 of the pattern for origin detection passes the origin detecting sensor 30, and becomes VB>VD when the reflected light from the second end part 15 starts to pass the origin detecting sensor 30. Their signal intensities are the same when the reflected light from the second end part 15 enters to the center of the detector of the origin detecting sensor 30, subsequently, are VA<VC again, and are the same weak intensities after the second end part 15 finishes passing the origin detecting sensor 30. In other word, the signal variations of VA and VC are opposite to that of VB and VD when VA and VC, and VB and VD are different intensities. FIG. 39 is a schematic diagram illustrating signals which are acquired by taking differences between the above signals. The ordinate axis is the same as FIG. 30, and thus descriptions are omitted. The first signal is acquired by subtracting VC from VA, and the second signal is acquired by subtracting VD from VB. In this embodiment, a differential process that each signal is subtracted on the basis of the central voltage value is performed as Embodiment 1. In FIG. 38, the directions of the variations from the central voltage of VA and VC are opposite to that of VB and VD, and thus the first and second signals, which are differential signals of them, have inverse symbols according to the variations from the central voltage. In other words, the first signal varies to a high voltage side relative to the central voltage, and the second signal voltage varies to a low voltage side relative to the central voltage. As described in Embodiment 1, the fifth signal is output as the origin signal in the origin detection of the invention when the determination result using the first signal and the first threshold is the same as the determination result using the second signal and the second threshold. FIG. 40 is a schematic diagram illustrating the third signal, which is processed using the first signal and the first threshold, and the fourth signal, which is processed using the second signal and the second threshold. The ordinate axis of FIG. 40 is the same as that of FIG. 35, and thus descriptions are omitted. In FIG. 39, since the variations on the basis of the central voltage of the first are opposite to that of second signals, the first signal has a voltage value higher than the first threshold at variation parts, but the second signal has a voltage lower than the second threshold at variation parts. Thus, as illustrated in FIG. 40, the third signal is output but the fourth signal fails to be output. FIG. 41 is a schematic diagram illustrating the fifth signal. The ordinate of FIG. 41 is the same as that of FIG. 35, and thus descriptions are omitted. As illustrated in FIG. 40, since the fourth signal is not a high level signal when the third signal is a high level signal, the fifth signal, which is acquired by calculating the logical product of the third and fourth signals, fails to be output. Thus, output of the origin signal from the other end part of the pattern for origin detection facing the end part of the pattern for origin detection set as the origin position is suppressed.

Figure 42:
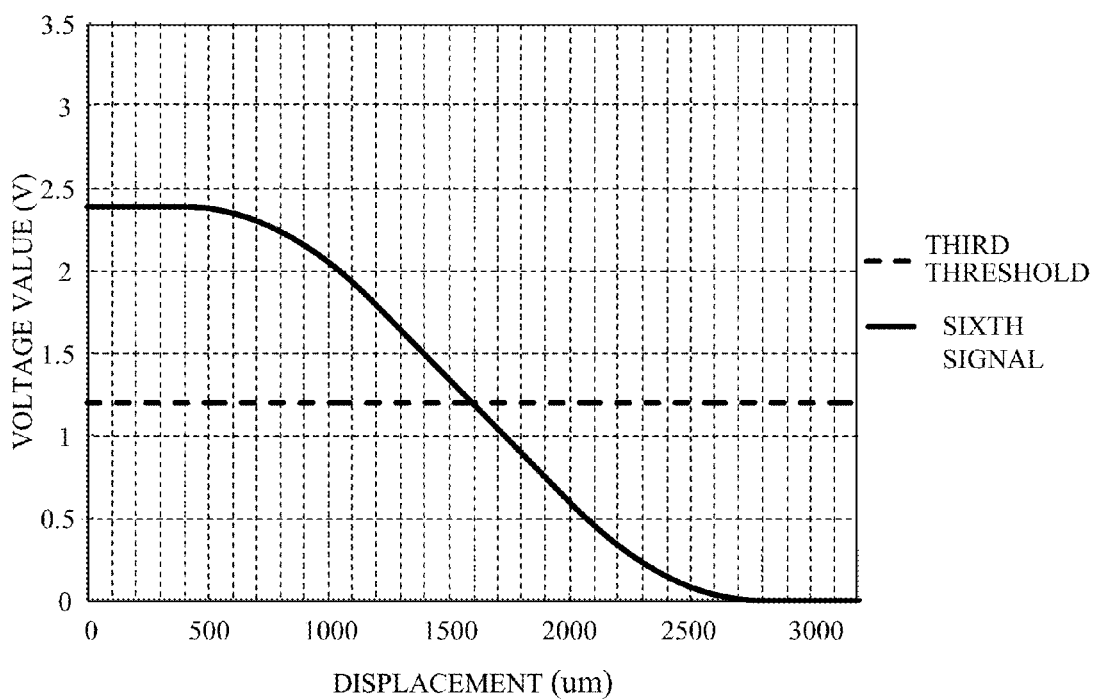
FIG. 42 is a schematic diagram illustrating a sixth signal and a third threshold when the reflected light from the second end part of the origin detecting pattern is received.

FIG. 42 is a schematic diagram illustrating the sixth signal, which is a sum signal of all detecting elements, and the third threshold using for processing the sixth signal. The ordinate axis of FIG. 42 is the same as that of FIG. 35, and thus descriptions are omitted. Signal intensities at the entire detected surface of the origin detecting sensor 30 grows in proportion as the end part of the pattern for origin detection passes the origin detecting sensor 30 regardless of a shape of the pattern for origin detection, and varies according to only variations of light receiving quantity by passing of the end part of the pattern for origin detection as illustrated in FIG. 35. Thus, the seventh signal, which is a region determination signal, is acquired by processing using the third threshold as the process of FIG. 35.

Figure 43:
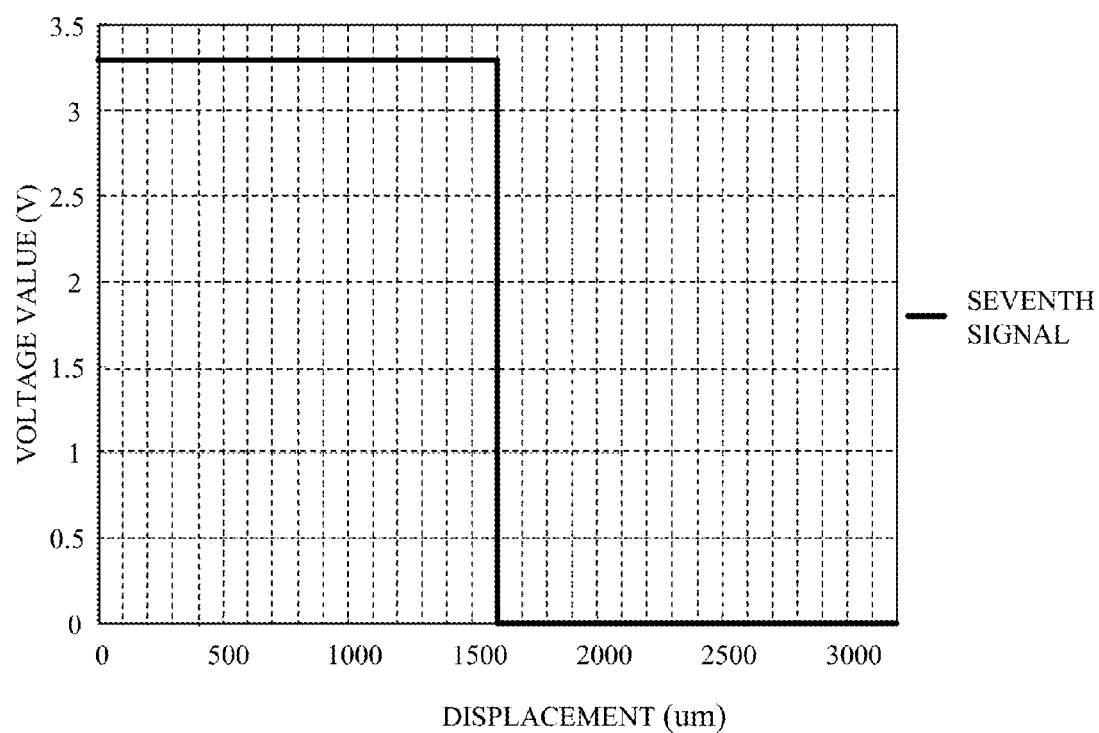
FIG. 43 is a schematic diagram illustrating a seventh signal when the reflected light from the second end part of the origin detecting pattern is received.

FIG. 43 is a schematic diagram illustrating the seventh signal. The ordinate axis of FIG. 43 is the same as that of FIG. 35, and thus descriptions are omitted. Treatment of the signal in FIG. 43 is the same as that of FIG. 36. In other words, if the seventh signal is a high level signal, the origin detecting sensor 30 reads the reflecting part of the pattern for origin detection, and if the seventh signal is a low level signal, the origin detecting sensor 30 reads the non-reflecting part of the pattern for origin detection.

AS described in Embodiment 1, the invention makes a specific signal using the light receiving elements, which have different light receiving sensitivity (signal sensitivity) according to positions, such as the central part and the periphery part. This means that larger differences of signals of the detecting elements at the receiving surface make the signal intensities larger. Thus, the proportion of the variations of the signal intensities of the second end part 15 is minified in this embodiment. Since the light receiving sensitivity (signal sensitivity) ratio of the central part and the periphery part is 1/2, the signal intensity is varied during ½ of the length in the detecting direction of the detector in this embodiment. Then, combinations of the light receiving state of the detecting elements are the same as the case when the light receiving sensitivity (signal sensitivity) ratio is 1/1, and signal profiles is approximately identical to the signal profiles of FIG. 16. The method according to Embodiment 1 cannot detect the origin based on the waveform.

Figure 44A:
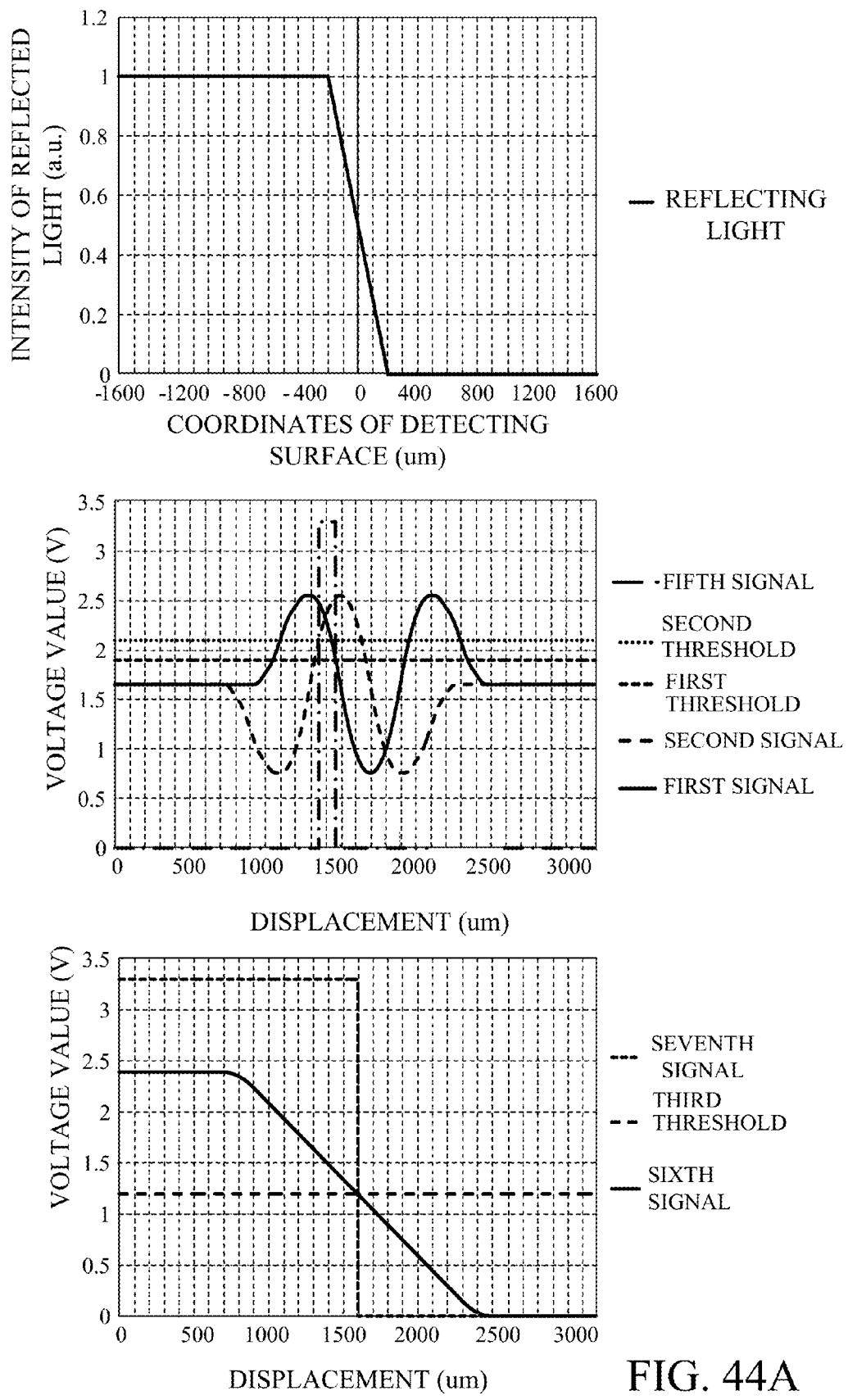
FIG. 44A is the signal intensity, the first signal, second signal, the fifth to seventh signals, and the first to third thresholds when the signal intensity at the detecting surface varies along ⅛ of a detection direction length of the origin detecting sensor.
Figure 44B:
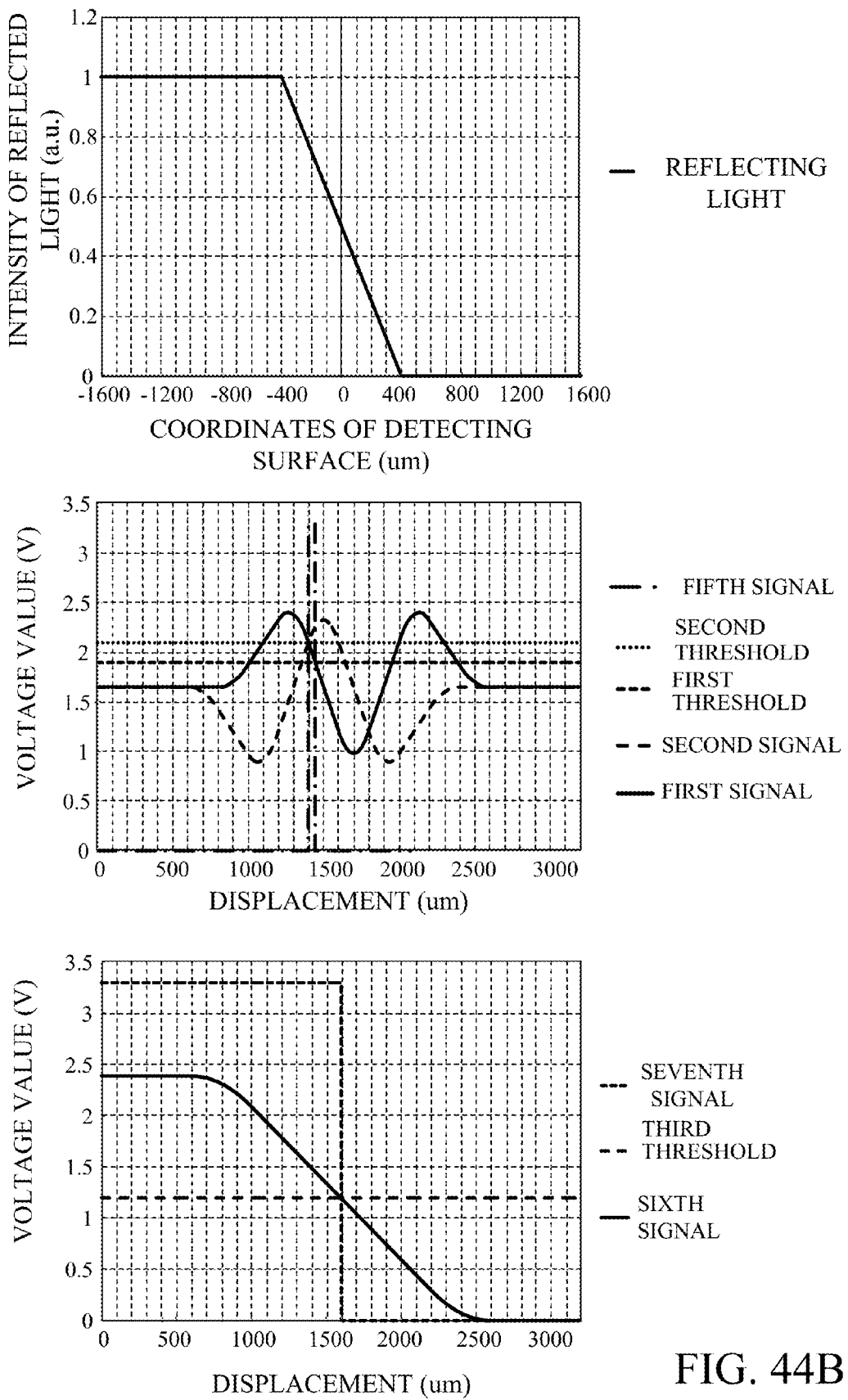
FIG. 44B is the signal intensity, the first signal, second signal, the fifth to seventh signals, and the first to third thresholds when the signal intensity at the detecting surface varies along ¼ of a detection direction length of the origin detecting sensor.
Figure 44C:
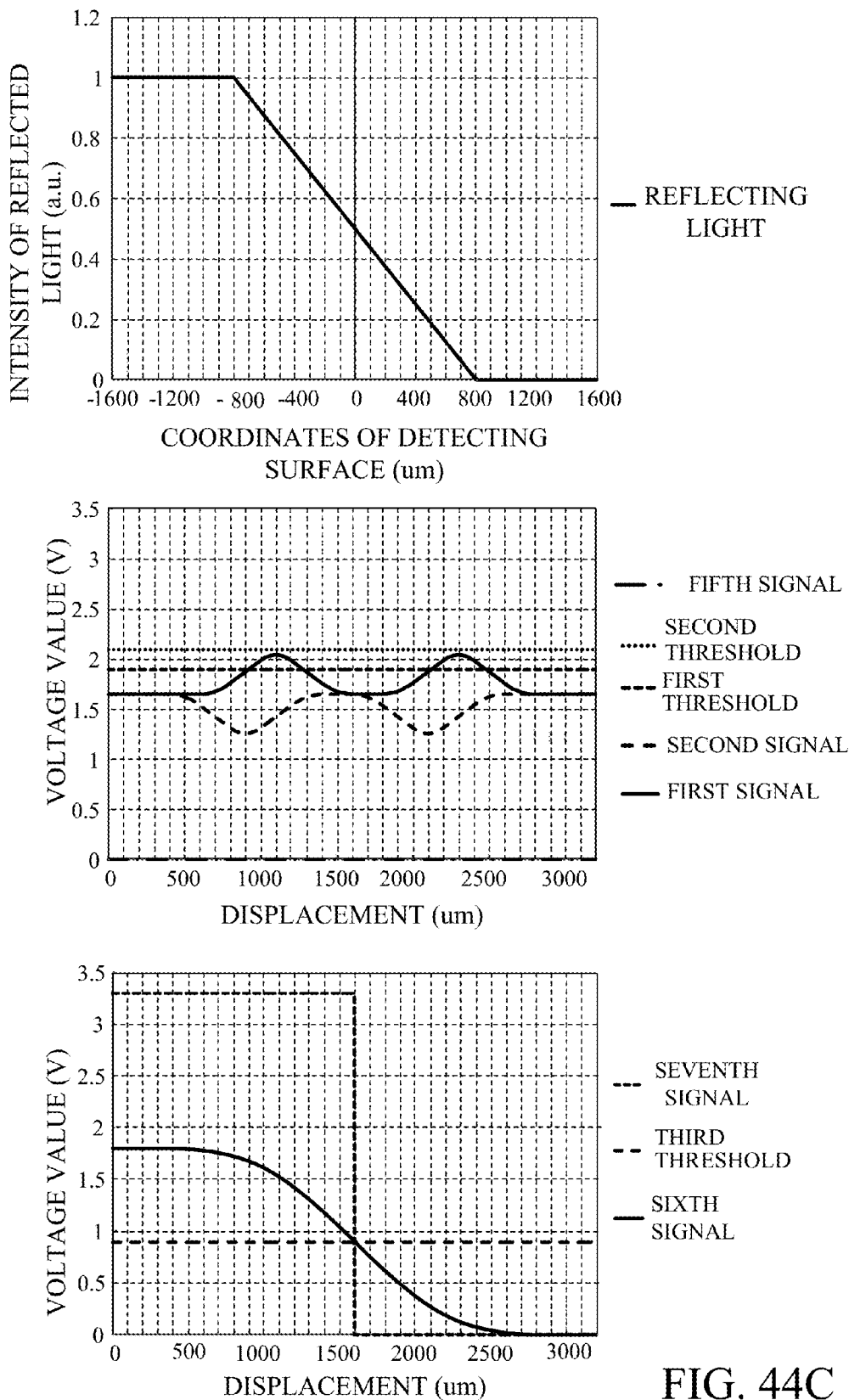
FIG. 44C is the signal intensity, the first signal, second signal, the fifth to seventh signals, and the first to third thresholds when the signal intensity at the detecting surface varies along ½ of a detection direction length of the origin detecting sensor.
Figure 44D:
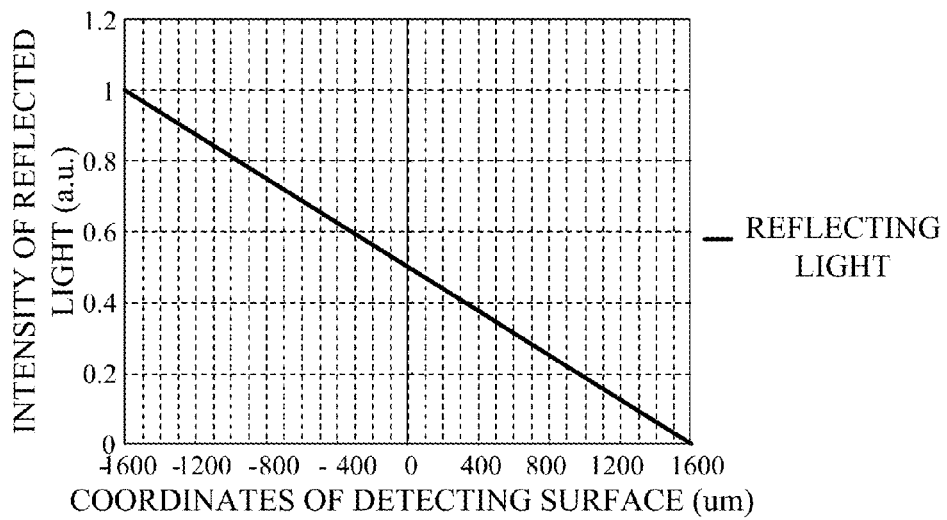
FIG. 44D is the signal intensity, the first signal, second signal, the fifth to seventh signals, and the first to third thresholds when the signal intensity at the detecting surface varies along a length equal to a detection direction length of the origin detecting sensor.
Figure 44D:
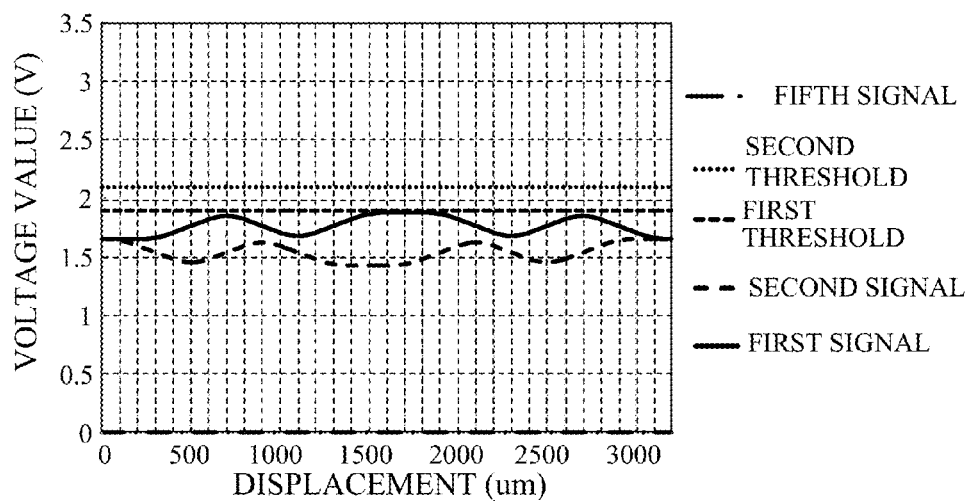
Figure 44D:
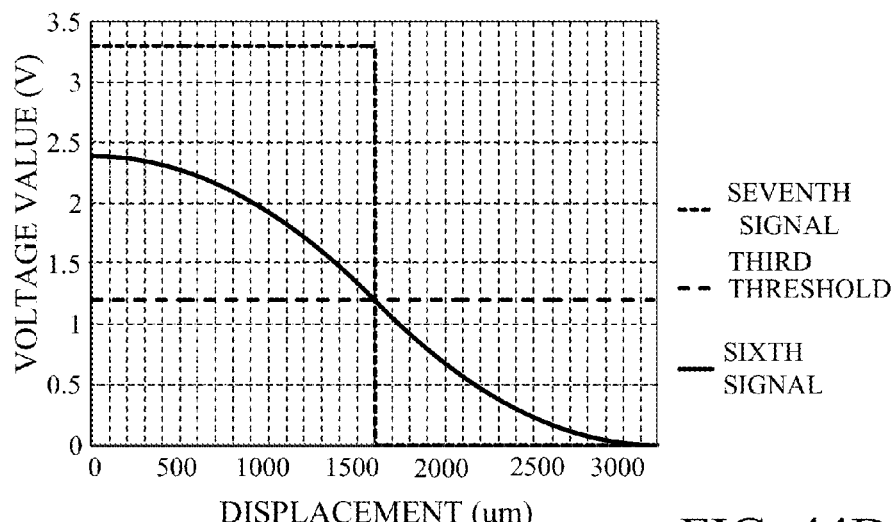

FIGS. 44A to 44D are the signal intensity, the first, second, fifth, and seventh signals, and the first to third thresholds at the detecting surface when a proportion of signal intensity variations at the end of the pattern varies. FIG. 44A is the case when the signal intensity at the detecting surface varies along ⅛ of the detection direction length of the detector of the origin detecting sensor 30. FIG. 44B is the case when the signal intensity at the detecting surface varies along ¼ of the detection direction length of the detector of the origin detecting sensor 30. FIG. 44C is the case when the signal intensity at the detecting surface varies along ½ of the detection direction length of the detector of the origin detecting sensor 30. FIG. 44D is the case when the signal intensity at the detecting surface varies along a length equal to the detection direction length of the detector of the origin detecting sensor 30. The ordinate axis of each figure is the same as that of FIG. 35, and thus descriptions are omitted. The cross point value of the first and second signals is on the low voltage side relative to the central voltage when a variation proportion relative to the detecting direction of the signal intensity decreases, and the cross point value is on the high voltage side relative to the central voltage when a length in the detection direction in which the signal intensity varies is ½. After that the first and second voltage are not intersected on the high voltage side relative to the central voltage again. The seventh signal, which is the region determining signal, acquired by a process of the sixth signal and the third threshold is independent of the variation portion of the signal intensities at the detecting surface. This is because the sixth signal is just the sum of the signal intensities, which all detecting elements at the detecting surface receives, unlike the first and second signals acquired by performing a differential operation using signals from the light receiving elements disposed at the different position on the light receiver. Thus, if the variation proportion in the detecting direction of the signal intensities at the light receiver is suppressed, the seventh signal, which is the region determining signal, exists.

Figure 45:
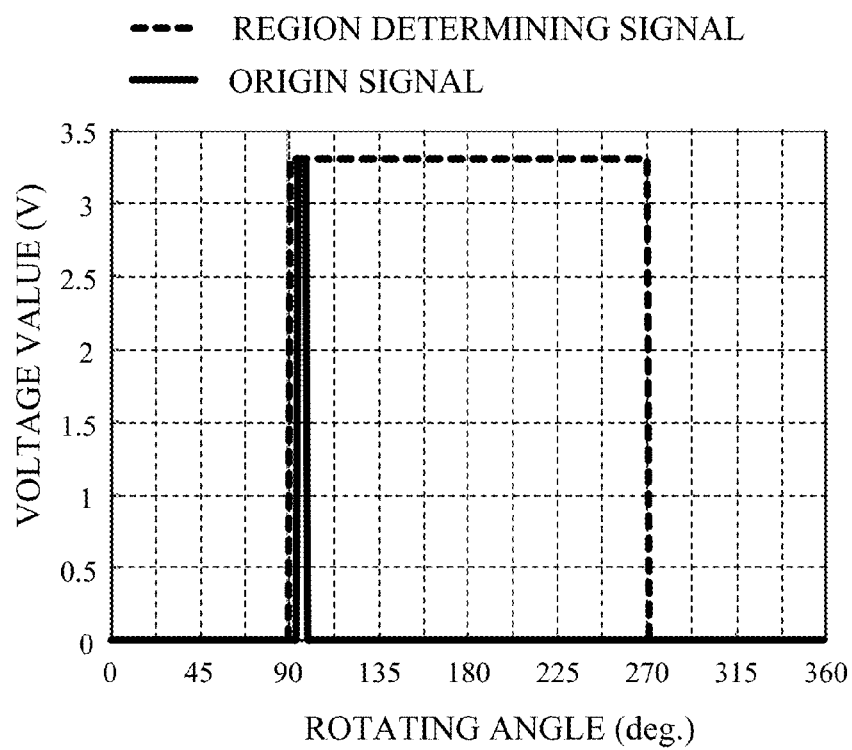
FIG. 45 is a schematic diagram illustrating an origin signal and a region determining signal relative to a rotation angle according to Embodiment 3.

The above configuration achieves the rotary encoder that acquires the output the region determining existence of the pattern, and stably outputs the origin signal on the basis of only the first end part 14 without outputting the origin signal on the basis of the second end part 15. FIG. 45 is a schematic diagram illustrating the origin signal and the region determining signal relative to the output angle of the encoder according to this embodiment. In FIG. 45, the abscissa axis denotes the rotation angles of the rotary scale and 360° thereof represents one rotation of the scale. The ordinate axis denotes the voltage values, which is a signal level of the origin signal and the region determining signal. To distinguish the first end part 14 and the other end of the pattern for origin detection part, the first end part 14 is positioned at a position whose rotation angle is 90° and the end part is positioned at a position whose rotation angle is 270°. As illustrated in FIG. 45, the origin signal, which is the standard position (angle) signal, is output at 90° of the rotation angle, and is not output at 270° of the rotation angle. Further, the region determining signal is output from 90° to 270° in which the pattern for origin detection indicates the reflecting part. In this embodiment, the present invention is capable of applying to the configuration having different detecting method of the signal and processing part as Embodiment 1.

Figure 46:
FIG. 46 is a schematic diagram illustrating a representative linear scale applicable to processes according to Embodiment 3.

Moreover, the present invention is used to the rotary encoder detecting the rotation angles in this embodiment, but may be applied to a linear encoder. Then, as illustrated in FIG. 46, an upper part of a track is a track for displacement detection and an under part of the track is a track for origin detection further performing region determination. If the origin detecting process and the region determining process according to this embodiment are applied to the configuration of FIG. 46, the origin signal is output only on the basis of an end part of a reflecting pattern arranged on a left side of the under part of the track, and is not output on the basis an end pattern which is arranged on a right side of the under part of the track and has a gradient reflecting pattern. However, the region determining signal is output from the both reflector. Moreover, the configuration of FIG. 46 is one example applied to the linear encoder, and the present invention is not limited this. In other words, the present invention can be applied to the configuration capable of performing origin detection only on the basis of the boundary of the pattern for origin detection set as the origin position without performing the origin detection on the basis of the other pattern for origin detection. Moreover, the end pattern of the pattern for origin detection has angles of inclination to decrease variation ratio in the detecting direction of the signal intensity in this embodiment, but the present invention is not limited to this if variation ratio in the detecting direction of the signal intensity can be decreased. For example, a reflective type encoder may have the configuration where variations of reflective rate relative to the detecting direction of the end part of the pattern for origin detection inclines and transmissive type encoder may have the configuration where variation of transmissive rate relative to the detecting direction thereof inclines.

Embodiment 4

Figure 47:
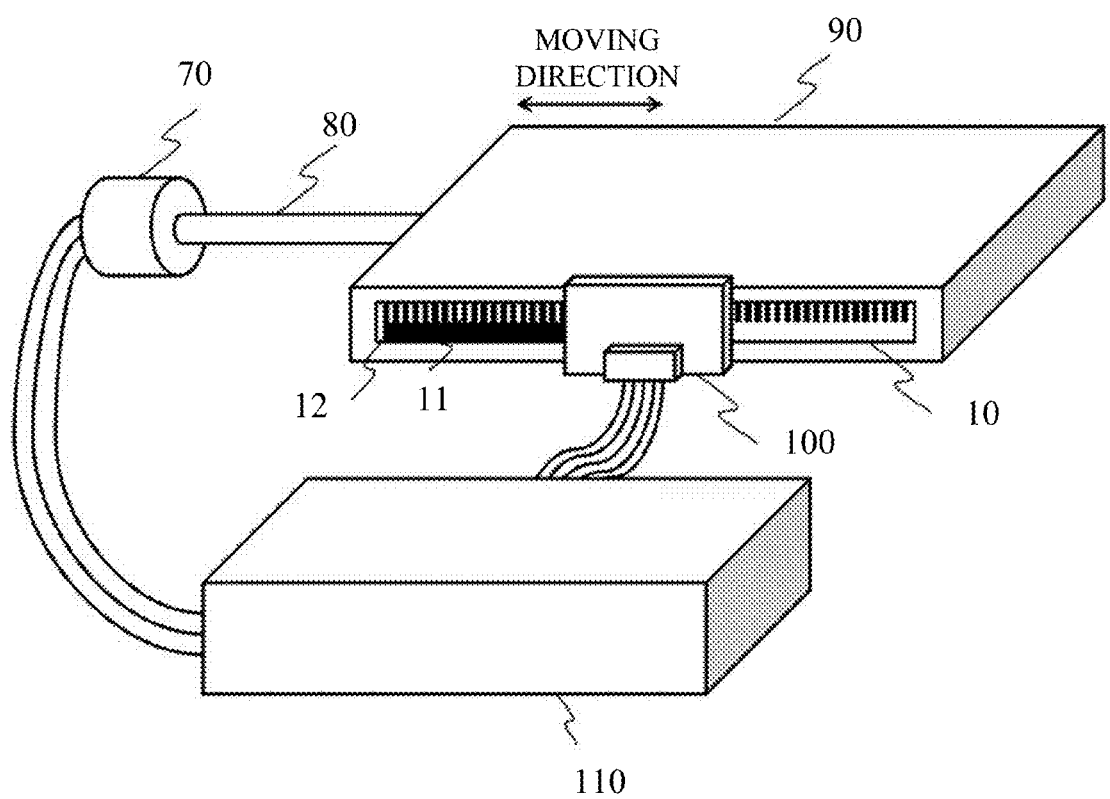
FIG. 47 is a schematic diagram illustrating a linear stage according to Embodiment 4.

FIG. 47 is a schematic diagram illustrating a linear stage according to this embodiment. The linear stage includes a scale 10, a motor 70, a ball screw 80, a stage 90, an encoder 100, and a controller 110. The encoder 100 includes the displacement detecting sensor 20, the origin detecting sensor 30, the displacement detecting signal processor 40, and the origin signal processor 50 of Embodiment 1. Additionally, the encoder 100 is a reflective type optical encoder as other embodiments.

The ball screw 80 is capable of converting a rotating motion of the motor 70 into a linear motion, and the stage 90 moves in a moving direction of FIG. 47 according to rotating amounts of the motor 70 by the ball screw 80. The scale 10 is attached to a side surface of the stage 90 so as to detect along a uniaxial moving direction, and the encoder 100 is mounted so as to read the scale 10. The controller 110 detects displacement of the stage 90 on the basis of a signal from the encoder 100, and controls a position of the stage 90 by controlling rotating amounts of the motor 70.

Displacement detection is performed by the displacement detecting sensor 20 of the encoder 100 and the pattern for displacement detection of the track 11 of the scale 10. The displacement detecting sensor 20 outputs two phase sinusoidal signals according to relative displacement from the scale 10, and the encoder 100 converts it into a position signal so as to transmit to the controller 110.

In this configuration, the controller 110 needs to acquire displacement from a standard position of the stage 90. This is for avoiding a false operation that the controller 110 continues to rotate the motor 70 by mistaking reaching of the stage 90 to the limit position in the uniaxial moving direction. A limit sensor may be used so as to acquire the limit position in the uniaxial moving direction, but is not used in this embodiment because components increase by providing the limit sensor in addition to the encoder 100. The components are the encoder 100 and peripheral circuit components of the limit sensor.

In this embodiment, a pattern for origin detection of the track 12 as a reference of an absolute position is prepared in the scale 10 apart from the pattern for displacement detection of the track 11, and is detected by the origin detecting sensor 30 of the encoder 100.

In this embodiment, when power is supplied, origin detection for searching an origin pattern is performed by moving the stage 90 so as to detect an origin. When the pattern for origin detection reaches on the origin detecting sensor 30 of the encoder 100, the fifth signal as the origin signal is transmitted to the controller 110 through the origin signal processor 50. The controller 110 recognizes that the stage 90 is positioned at the origin by receiving the origin signal, and then resets the detecting position to 0. After then, displacement detection regarded a region where the pattern for origin detection exists as the origin position is performable, and thus the stage 90 is capable of being accurately controlled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-044220, filed on March 6, which is hereby incorporated by reference herein in its entirety.

What is claimed is:
1. An encoder, comprising:
a scale including an origin detecting pattern;
an origin detector reading the origin detecting pattern; and
a processor outputting an original signal,
wherein the origin detector includes a plurality of detecting element groups, wherein each detecting element group includes at least a first detector, a second detector, a third detector, and a fourth detector, wherein the origin detector is configured so that a first signal sensitivity of the detectors distributed at a center is larger than a second signal sensitivity of the detectors distributed at a periphery, wherein the origin detecting pattern includes an origin pattern, where a length along a detecting direction of a part, which is detected by the origin detector and has a physical characteristic different from an origin peripheral part, is larger than a length along the detecting direction of each detection element group, wherein the origin detector outputs a first signal based on the first and third detectors, and a second signal based on the second and fourth detectors, wherein the processor acquires a third signal by processing the first signal and a first threshold, and fourth signal by processing the second signal and a second threshold, and outputs a fifth signal acquired by processing the third and fourth signal as the origin signal, and wherein the origin detecting pattern is configured so that a ratio of variation of a physical characteristic relative to a detecting direction of an end of the origin detecting pattern set as an origin position is larger than a ratio of variation of a physical characteristic relative to a detecting direction of an end of the origin detecting pattern other than the origin position.

2. An apparatus comprising the encoder according to claim 1.

3. An encoder comprising,
a scale including an origin detecting pattern;
an origin detector reading the origin detecting pattern; and
a processor outputting an origin signal,
wherein the origin detector includes a plurality of detecting element groups, wherein each detecting element group includes at least a first detector, a second detector, a third detector, and a fourth detector, wherein the origin detector is configured so that a first signal sensitivity of the detectors distributed at a center is larger than a second signal sensitivity of the detectors distributed at a periphery, wherein the origin detecting pattern includes an origin pattern, where a length along a detecting direction of a part, which is detected by the origin detector and has a physical characteristic different from an origin peripheral part, is larger than a length along the detecting direction of each detecting element group, wherein the origin detector outputs a first signal based on the first and third detectors, and a second signal based on the second and fourth detectors, wherein the processor acquires a third signal by processing the first signal and a first threshold, and a fourth signal by processing the second signal and a second threshold, and outputs a fifth signal acquired by processing the third and fourth signals as the origin signal, and wherein the origin detector outputs a sixth signal, which is an average value of output from all detector of a detecting surface of the origin detector including at least the first, second, third, and fourth detector, and uses a seventh signal, which is acquired by processing the sixth signal using a third threshold, as a signal for region determination.

4. An apparatus comprising the encoder according to claim 3.

* * * * *